US009581966B1

(12) United States Patent
    Georges, III

(10) Patent No.: US 9,581,966 B1
(45) Date of Patent: Feb. 28, 2017

(54) SYSTEMS AND METHODOLOGIES RELATED TO 3-D IMAGING AND VIEWING

(71) Applicant: INTEGRITY APPLICATIONS INCORPORATED, Carlsbad, CA (US)

(72) Inventor: James A. Georges, III, Brighton, MI (US)

(73) Assignee: Integrity Applications Incorporated, Carlsbad, CA (US)

(*) Notice: Subject to any disclaimer, the term of this patent is extended or adjusted under 35 U.S.C. 154(b) by 731 days.

(21) Appl. No.: 13/767,775

(22) Filed: Feb. 14, 2013

Related U.S. Application Data

(60) Provisional application No. 61/599,334, filed on Feb. 15, 2012.

(51) Int. Cl.
    *G03H 1/22* (2006.01)
    *G03H 1/12* (2006.01)
    *G03H 1/10* (2006.01)

(52) U.S. Cl.
    CPC ............. *G03H 1/2294* (2013.01); *G03H 1/10* (2013.01); *G03H 1/12* (2013.01)

(58) Field of Classification Search
    CPC ................... G03H 1/08; G03H 1/0808; G03H 2001/0825; G03H 1/10; G03H 1/12; G03H 2001/0094; G03H 2001/0484
    USPC ................................ 359/9–11, 23, 27, 29, 32
    See application file for complete search history.

(56) References Cited

U.S. PATENT DOCUMENTS

| | | |
|---|---|---|
| 6,163,391 A | 12/2000 | Curtis et al. |
| 6,219,435 B1 | 4/2001 | Horikoshi et al. |
| 6,246,796 B1 | 6/2001 | Horikoshi et al. |
| 6,281,994 B1 | 8/2001 | Horikoshi et al. |

(Continued)

FOREIGN PATENT DOCUMENTS

DE    10 2005 023743    5/2005

OTHER PUBLICATIONS

James A. Georges, III "Optical spatial heterodyne interferometric Fourier transform technique (OSHIFT) and a resulting interferometer", Advance Wavefront Control: Methods, Devices, and Applications V, Proc. of SPIE vol. 6711, pp. 671104-1-671104-12, 2007.

(Continued)

*Primary Examiner* — Darryl J Collins
*Assistant Examiner* — Journey Sumlar
(74) *Attorney, Agent, or Firm* — Knobbe Martens Olson & Bear LLP

(57) ABSTRACT

Systems and methods for three-dimensional imaging and viewing are disclosed. A method for generating a three-dimensional image may include producing a pattern in a spatial light modulator based on data representative of an image of an object, illuminating the spatial light modulator so as to yield a projection beam, masking at least one portion of the projection beam such that a portion of the projection beam is selected, and propagating the selected portion to an exit pupil so as to form a virtual 3-D image of the object when viewed at the exit pupil. An apparatus may include a projector comprising a spatial light modulator array that modulates the phase of light to produce a phase modulated beam that is projected to a viewer thereby forming a 3-D image of the object when viewed by the viewer, and processing electronics configured to extract phase information from a signal.

35 Claims, 19 Drawing Sheets

(56) References Cited

U.S. PATENT DOCUMENTS

| | | | |
|---|---|---|---|
| 6,982,817 B1 | 1/2006 | Halldorsson | |
| 6,999,178 B2 | 2/2006 | Hanson et al. | |
| 7,119,905 B2 | 10/2006 | Bingham et al. | |
| 7,839,548 B2 | 11/2010 | Schwerdtner | |
| 7,924,430 B2 | 4/2011 | Georges, III | |
| 8,199,387 B1* | 6/2012 | Aye et al. | 359/11 |
| 8,405,059 B2 | 3/2013 | Heintzmann et al. | |
| 8,422,799 B1 | 4/2013 | Witzgall et al. | |
| 8,433,158 B2 | 4/2013 | Menon | |
| 8,913,149 B1 | 12/2014 | Georges, III | |
| 9,219,905 B1 | 12/2015 | Georges, III | |
| 9,354,606 B1 | 5/2016 | Georges, III | |
| 2002/0190922 A1* | 12/2002 | Tsao | 345/32 |
| 2005/0270610 A1* | 12/2005 | Moon | 359/30 |
| 2006/0192972 A1 | 8/2006 | Bingham et al. | |
| 2007/0113012 A1 | 5/2007 | Cable et al. | |
| 2007/0229850 A1 | 10/2007 | Herber | |
| 2008/0074742 A1 | 3/2008 | Kim et al. | |
| 2008/0198431 A1 | 8/2008 | Schwerdtner | |
| 2009/0027686 A1 | 1/2009 | Georges, III | |
| 2009/0086296 A1 | 4/2009 | Renaud-Goud | |
| 2009/0285463 A1 | 11/2009 | Otazo | |
| 2010/0008597 A1 | 1/2010 | Findlay et al. | |
| 2010/0014136 A1 | 1/2010 | Haussler et al. | |
| 2010/0033784 A1 | 2/2010 | Renaud-Goud | |
| 2010/0110208 A1 | 5/2010 | Gerwe | |
| 2010/0149139 A1 | 6/2010 | Kroll et al. | |
| 2010/0253769 A1* | 10/2010 | Coppeta et al. | 348/58 |
| 2011/0032337 A1 | 2/2011 | Ramos et al. | |
| 2011/0085051 A1 | 4/2011 | Chi et al. | |
| 2011/0211036 A1 | 9/2011 | Tran | |
| 2011/0304723 A1 | 12/2011 | Betzig | |
| 2012/0050460 A1* | 3/2012 | Tsang et al. | 348/40 |
| 2012/0099798 A1 | 4/2012 | Saruta et al. | |
| 2012/0162448 A1 | 6/2012 | Au et al. | |
| 2013/0286181 A1 | 10/2013 | Betzig et al. | |
| 2014/0153692 A1 | 6/2014 | Larkin et al. | |

OTHER PUBLICATIONS

Aerial 3D Display, obtained from the website http://burton-jp.com/en/index.htm on Feb. 16, 2012.

Buell, W.F., et. al., "Synthetic-Aperture Imaging Ladar," Crosslink Summer, pp. 45-59, Aug. 2004.

Beck, S.M. et. al., "Synthetic-aperture imaging laser radar: laboratory demonstration and signal processing," Applied Optics, vol. 44, No. 35, pp. 7621-7629, Dec. 10, 2005.

Buell, W. et. al., "Demonstration of Synthetic Aperture Imaging Ladar," Laser Radar Technology and Applications X, edited by Gary W. Kamerman, Proc. of SPIE, vol. 5791, pp. 152-166, 2005.

Bashkansky, M., et. al., "Two-dimensional synthetic aperture imaging in the optical domain," Optics Letters, vol. 27, No. 22, pp. 1983-1985, Nov. 15, 2002.

Bashkansky, M., et. al., "Synthetic aperture imaging at 1.5 micron: Laboratory demonstration and potential application to planet surface studies," Highly innovative space telescope concepts edited by H.A. MacEwen, Proc. of SPIE, vol. 4849, pp. 48-56, 2002.

Lucke, R.L., et. al., "Photon-limited synthetic-aperture imaging for planet surface studies," Applied Optics, vol. 41, No. 24, pp. 5084-5095, Aug. 20, 2002.

Marcus, S., "Solid-state laser synthetic aperture radar," Applied Optics, vol. 33, No. 6, pp. 960-964, Feb. 20, 1994.

Rabb, D., et. al., "Distributed aperture Synthesis," Optics Express, vol. 18, No. 10, pp. 10334-10342, May 10, 2002.

Stafford, J.W., et. al., "Experimental demonstration of stripmap holographic aperture ladar system," Applied Optics, vol. 49, No. 12, pp. 2262-2270, Apr. 20, 2010.

Duncan, B.D., et. al., "Stripmap Holographic Aperture Ladar," 21st Annual Meeting of the IEEE Lasers and Electro-Optics Society, LEOS 2008, pp. 511,512, Nov. 9-13, 2008.

Marron, J.C., et. al., "Distributed Aperture Active Imaging," Laser Radar Technology and Applications XII edited by Monte D. Turner and Gary W. Kamerman, Proc. of SPIE, vol. 6550, pp. 65500A-1-65500A-7, 2007.

Christopher Drew, "Drones are weapons of choice in Fighting Qaeda," The New York Times (http://www.nytimes.com/2009/03/17/business/17uav.html?_r=1), Mar. 17, 2009.

Gaskill J.D., "Linear Systems, Fourier Transforms, and Optics", John Wiley & Sons, Inc., New York 1978, pp. 199-202.

Goodman J.W., "Introduction to Fourier Optics", 2nd edition, McGraw-Hill, New York. 1996, pp. 5, 9, 308-309.

Marcel J. E. Golay, "Point Arrays Having Compact, Nonredundant Autocorrelations," J. Opt. Soc. Am. 61, 272-273 1971.

Dillow, New Holographic Device Can Record and Display 3-D Holograms in Near Real Time, posted Nov. 3, 2010, http://www.popsci.com/technology/article/2010-11, pp. 1-6.

Horton, "Air Force backing UA's hologram development", Feb. 9, 2008, http://tucsoncitizen.com/morgue/2008/02/09/76478-air-force-backinq-ua-s-hologram-development.

Zebra Imaging—http://en.wikipedia.org/wiki/Zebra Imaging, pp. 1-3.

Saenz, "3D Hologram Prints Invade Military, Commercial Design", posted Dec. 16, 2010, http://singularityhub.com/2010/12/16/3d-hologram-prints-invade-military-commercial-design, pp. 1-6.

"Overview of Current Methods of 3D Display," obtained from the website http://www.holovision.com.

"HolovisionTM: Three-Dimensional Display Without Special Eyewear," obtained from the website http://www.holovision.com.

Benzie, P., "A Survey of 3DTV Displays: Techniques and Technologies," Circuits and Systems for Video Technology, IEEE Transactions on, vol. 17, No. 11, pp. 1647,1658, Nov. 2007.

"White Paper: Glasses-Free 3D vs 3D Holographic: Provision to the Rescue," obtained from the website http://provision.tv/plugins/tinymce/plugins/filemanager/files/Glasses%20Free%203D%20vs%203D%20Holographic.pdf.

Ozaktas, H.M. and Onural L., "Signals and Communication Technology: Three-Dimensional Television: Ch. 13—Solving the 3D Problem," pp. 471-503, 2007.

Carlos A. Soto, "5 Technologies Changing our World," Washington Technology, Apr. 5, 2011.

David H. Freeman, "Future Tech: Looking Forward to the Post-Screen Era," Mar. 2011 issue of Discover Magazine.

Sarah J. Purewal, "Holographic TV Coming Your Way in 2017," obtained from http://www.techhive.com/article.209772/Holographic_TV_Coming_Your_Way_in_2017.html.

Alfalou, A., et al., "Optical image compression and encryption methods." Advances in Optics and Photonics 1.3 (2009), pp. 589-636.

Seung-Cheol Kim, Dong-Choon Hwang, Dong-Hwi Lee, and Eun-Soo Kim, "Computer-generated holograms of a real three-dimensional object based on stereoscopic video images," Appl. Opt. 45, 5669-5676 (2006).

Roggemann, Michael C., et al. Three-Dimensional Imaging and Satellite Attitude Estimation Using Pulse Laser Illumination and a Remote Ultra-Low Light Imaging (RULLI) Sensor for Space Situational Awareness (SSA). Air Force Research Lab, Kihei Maui HI Detachment 15, 2008.

David Abookasis and Joseph Rosen, "Three types of computer-generated hologram synthesized from multiple angular viewpoints of a three-dimensional scene," Appl. Opt. 45, 6533-6538 (2006).

Office Action dated May 22, 2015 in U.S. Appl. No. 13/953,371.
Office Action dated Apr. 28, 2015 in U.S. Appl. No. 13/955,519.
Notice of Allowance dated Aug. 17, 2015 in U.S. Appl. No. 13/955,519.

Karaman et al,. "Synthetic Aperture Imaging for Small Scale Systems", May 1995, IEEE Transactions on Ultrasonics, Ferroelectrics; and Frequency Control, vol. 42, No. 3, pp. 429-442.

U.S. Appl. No. 14/564,438, filed Mar. 25, 2015, Apparatus and Techniques for Enhanced Resolution Imaging.

U.S. Appl. No. 13/308,110, filed Nov. 30, 2011, Appartus and Techniques for Enhanced Resolution Imaging.

(56) References Cited

OTHER PUBLICATIONS

U.S. Appl. No. 13/953,371, filed Jul. 29, 2013, Systems and Methodologies Related to Generating Projecable Data for 3D-Viewing.

U.S. Appl. No. 13/955,519, filed Jul. 31, 2013, Systems and Methodologies Related to Formatting Data for 3-D Viewing.

Jabbour, et al., "Design of axially super-resolving phase filters using the method of generalized projections", Optics Communications, vol. 281, Issue 8, Apr. 15, 2008, pp. 2002-2011.

Notice of Allowance dated Jan. 15, 2016 in U.S. Appl. No. 13/953,371.

Notice of Allowance dated Nov. 18, 2016 in U.S. Appl. No. 14/942,810.

* cited by examiner

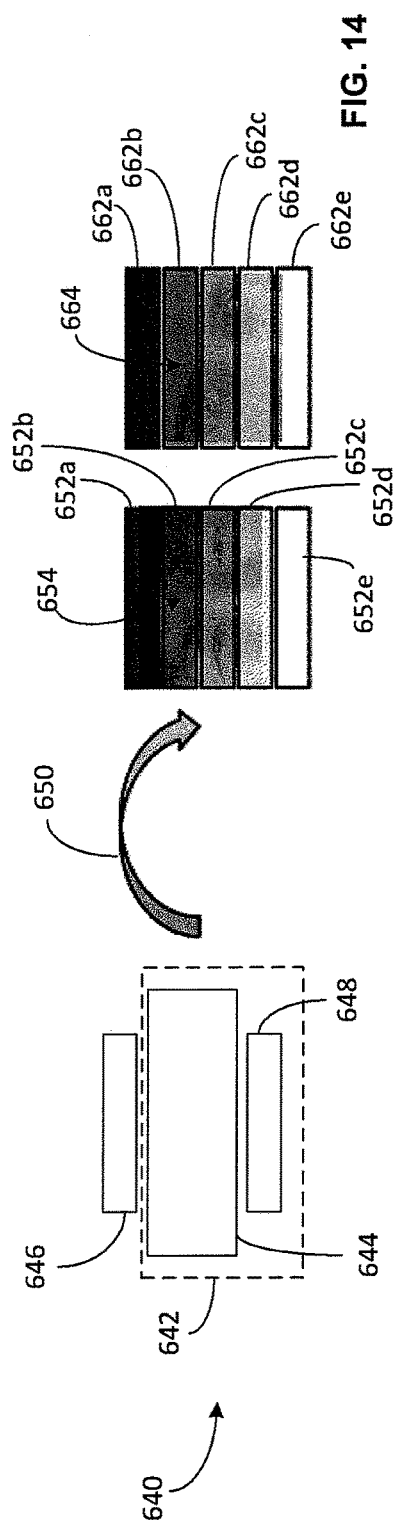
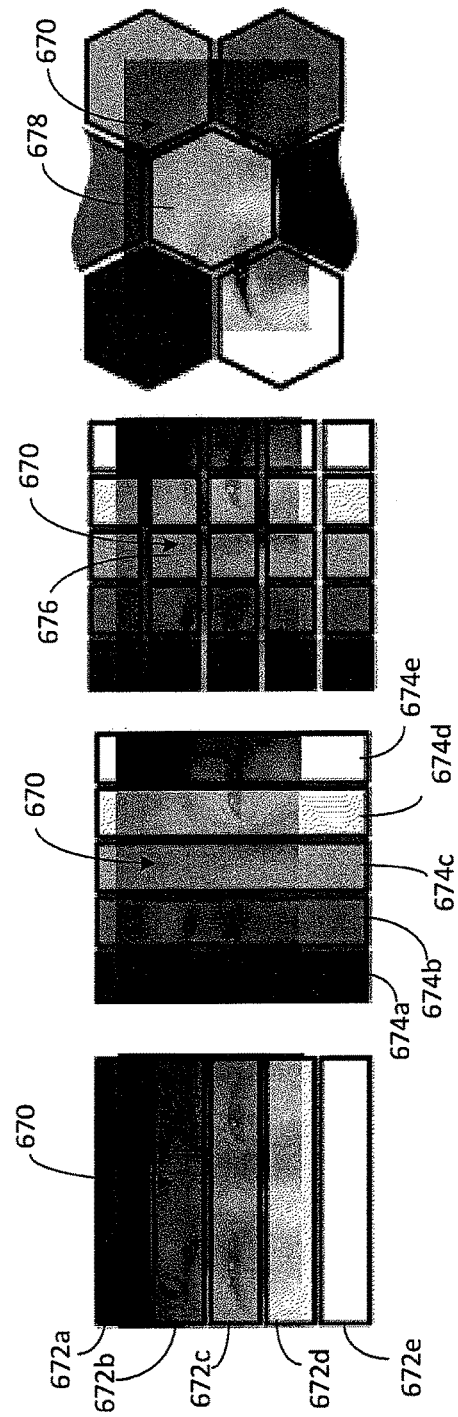
FIG. 14
FIG. 15A
FIG. 15B
FIG. 15C
FIG. 15D

SYSTEMS AND METHODOLOGIES RELATED TO 3-D IMAGING AND VIEWING

RELATED APPLICATIONS

This application claims the benefit of U.S. Provisional Application No. 61/599,334, filed Feb. 15, 2012, titled "SYSTEMS AND METHODOLOGIES RELATED TO 3-D IMAGING AND VIEWING," which is incorporated by reference herein in its entirety. U.S. application Ser. No. 13/308,110 filed Nov. 30, 2011, titled "APPARATUS AND TECHNIQUES FOR ENHANCED RESOLUTION IMAGING" is incorporated herein by reference in its entirety.

TECHNICAL FIELD

This disclosure relates to three-dimensional (3-D) imaging and viewing three-dimensional images.

DESCRIPTION OF THE RELATED TECHNOLOGY

Holography includes techniques for generating three-dimensional images. Traditional implementations of generating and viewing holograms involves the use of a laser and interference to record information about a scene, and then appropriately providing illumination to view a generated hologram. Traditional holograms have been made using a photographic emulsion (or other suitable medium) in which information about a scene is recorded in a way such that when properly illuminated, a three-dimensional representation of the scene can be viewed.

Different types of holograms can be made. For example, a transmission holograms are viewed by shining laser light through them and looking at the reconstructed image from the side of the hologram opposite the source. Another kind of common hologram, a reflection hologram, can be viewed using a white-light illumination source on the same side of the hologram as the viewer and is the type of hologram normally seen in holographic displays.

Holograms have been used by hobbyists, for art and by educational institutions to study light interference principles. Commercial uses include data storage, security (for example, credit cards), post offices and shipping companies to determine package sizes. As the uses of holograms continues to grow, it would be advantageous for many applications for advanced opto-electronic systems and methods for generating and viewing three-dimensional information about a scene.

SUMMARY

In various, although not necessarily all, embodiments disclosed herein, a larger collective synthetic aperture is obtained by collecting information from a plurality of smaller aperture images. Increased resolution may thus be achieved in some cases.

Various embodiments described herein relate to a method for generating a 3-D image. In this method a pattern is produced in a spatial light modulator based on data representative of an image of an object. The spatial light modulator is illuminated so as to yield a projection beam. At least one portion of the projection beam is masked such that a portion of the projection beam is selected. The selected portion is propagated to an exit pupil so as to form a virtual 3-D image of the object when viewed by a viewer at the exit pupil.

In some embodiments, the method can further comprise interfering an intensity beam reflected from the object and obtained through an imaging pupil and a reference beam thereby forming the image of the object from which the data is obtained. The imaging pupil and the reference beam can form a plurality of features in a Fourier transform of the image. The features can comprise a central lobe and side lobes. The image can be formed on a sensor array that outputs a signal representative of the image of the object. The method can further comprise transmitting the data representative of the image of the object to the spatial light modulator, the data coming from the signal. The signal can be coupled to the spatial light modulator such that the pattern can be produced in a spatial light modulator. The signal can be coupled to the spatial light modulator via wireless or via a transmission line. The sensor can comprise anamorphic shaped pixels thereby compensating for loss of resolution due to the masking.

In some embodiments, forming of the image of the object can include forming an intensity image including interference fringes resulting from the interference. The virtual 3-D image viewed at the exit pupil can substantially replicate what the viewer would see when positioned at the imaging pupil.

In some embodiments, the exit pupil can be dimensioned to provide a viewable area that covers both of the viewer's eyes. The exit pupil can be scanned relative to the viewer so as to yield an effectively larger viewable area. The exit pupil can be rotated relative to the viewer so as to yield an effectively larger viewable area. The exit pupil's location can be adjustable relative to the viewer.

In some embodiments, at least one of forming the image of the object and producing a pattern in a spatial light modulator can be performed so that their respective images compensate for loss of resolution due to the masking. The spatial light modulator can comprise anamorphic shaped pixels thereby compensating for loss of resolution due to the masking. The image can be formed with non-uniform magnification in different directions.

In some embodiments, the at least one portion of the projection beam can comprise at least one separated portion of the projection beam. The at least one portion of the projection beam can include a center lobe and side lobes. The selected portion of the projection beam can correspond to one of the side lobes.

Various embodiments described herein relate to an apparatus for generating a 3-D image. The apparatus comprises a spatial light modulator, a light source, a mask, and projection optics. The spatial light modulator is capable of producing a pattern based on data representative of an image of an object. The light source is disposed to illuminate the spatial light modulator so as to yield a projection beam. The mask is configured to mask at least one portion of the projection beam such that a portion of the projection beam is selected. The projection optics is configured to propagate the selected portion to an exit pupil so as to form a virtual 3-D image of the object when viewed by a viewer at the exit pupil.

In some embodiments, the apparatus can further comprise a camera comprising an imaging pupil and a reference beam arm, wherein the camera is configured to interfere an intensity beam reflected from the object and obtained through an imaging pupil and a reference beam provided by the reference beam arm thereby forming the image of the object from which the data is obtained. The imaging pupil and the reference beam can form separate features in a Fourier transform of the image wherein the separate features comprise a central lobe and side lobes. The apparatus can further comprise a sensor on which the image is formed wherein the sensor has an output that outputs a signal representative of the image of the object. The sensor can be in communication with the spatial light modulator such that the data representative of the image of the object can be transmitted to the spatial light modulator wherein the data is coming from the signal. The signal can be coupled to the spatial light modulator such that the pattern can be produced in a spatial light modulator. The signal can be coupled to the spatial light modulator via wireless or via a transmission line. The sensor can comprise anamorphic shaped pixels thereby compensating for loss of resolution due to the masking. The virtual 3-D image viewed at the exit pupil can substantially replicate what the viewer would see when positioned at the imaging pupil.

In some embodiments, the exit pupil can be dimensioned to provide a viewable area that covers both of the viewer's eyes. The apparatus can be configured such that the exit pupil can be scanned relative to the viewer so as to yield an effectively larger viewable area. The exit pupil can be rotated relative to the viewer so as to yield an effectively larger viewable area. The exit pupil's location can be adjustable relative to the viewer such that eye relief can be varied. The spatial light modulator can comprise anamorphic shaped pixels thereby compensating for loss of resolution due to the masking. The projection optics that convey the projection beam from the mask to the eye can provide non-uniform magnification in different directions. The at least one portion of the projection beam can comprise at least one separated portion. The masked portion of the projection beam can include a center lobe and side lobes. The selected portion of the projection beam can correspond to one of the side lobes.

Various embodiments described herein relate to a method for generating a 3-D image wherein the method comprises forming an image of an object on a sensor array, reproducing the image on a spatial light modulator; producing a projection beam by illuminating the spatial light modulator, and projecting a limited portion of the projection beam to an exit pupil so as to form a virtual 3-D image of the object when viewed by a viewer at the exit pupil. The limited portion can comprises less than half of light in the beam. The limited portion comprises only one side lobe of the beam.

Various embodiments described herein relate to a method for generating a 3-D image wherein image data is processed by performing at least one of a digital spatial domain to spatial frequency domain transform, digital masking, and a digital spatial frequency domain to spatial domain transform. A pattern is produced in a spatial light modulator that selectively modulates the phase of light using the processed data. The spatial light modulator is illuminated so as to yield a projection beam. At least a portion of the beam is propagated to an exit pupil so as to form a virtual 3-D image of the object when viewed by a viewer at the exit pupil.

In some embodiments, the processing image data can include performing a digital spatial frequency domain to spatial domain transform. Processing the image data can include performing digital masking. Processing the image data can include performing a digital spatial domain to spatial frequency domain transform.

Various embodiments described herein relate to a method of enabling the production of a 3-D image comprising extracting phase information from an intensity image and providing the phase information to a projector comprising a spatial light modulator array that modulates the phase of light to produce a phase modulated beam that is projected to a viewer thereby forming a 3-D image of the object when viewed by the viewer.

In some embodiments, the intensity image can comprise interference fringes. Extracting phase information can comprise at least one of performing a digital spatial domain to spatial frequency domain transform, digital masking, and performing a digital spatial frequency domain to spatial domain transform.

Various embodiments described herein relate to an apparatus for enabling the production of a 3-D image. The apparatus comprises a projector comprising a spatial light modulator array that modulates the phase of light to produce a phase modulated beam that is projected to a viewer thereby forming a 3-D image of the object when viewed by the viewer and processing electronics configured to extract phase information from a signal.

In some embodiments, the electronics can be configured to perform a digital spatial frequency domain to spatial domain transform. The electronics can be configured to perform digital masking. The electronics can be configured to perform a digital spatial domain to spatial frequency domain transform.

Various embodiments described herein relate to a method for generating a 3-D image, the method comprising forming an image of an object. The image includes an interference of an intensity image of the object obtained through an imaging pupil and a reference beam. The imaging pupil and the reference beam form separate features in a Fourier transform of the interference. The method further comprises transmitting data representative of the image, generating a projectable image based on the data, and illuminating the projectable image so as to yield a projection beam. The method additionally comprises separating the projection beam spatially based on the separate features of the Fourier transform of the interference, masking the separated projection beam such that a selected portion of the projection beam is allowed to pass and the remaining portion is blocked, and projecting the selected portion to an exit pupil so as to form a virtual 3-D image of the object when viewed by a viewer at the exit pupil.

In some embodiments, the method can further comprise processing the data between forming of the image and generating of the projectable image. The transmitting can include a substantially direct transfer of data. The transmitting can include a wire-based transfer. The transmitting can include a wireless transfer.

In some embodiments, the separate features can include a center lobe and at least one side lobe representative of a range of spatial frequency of the object. The selected portion of the projection beam can correspond to one of the at least one side lobe. The virtual 3-D image viewed at the exit pupil can substantially replicate what the viewer would see when positioned at the imaging pupil. Forming of the image can include forming an intensity image of the interference.

In some embodiments, the reference beam can include a coherent light beam. The coherent light beam can include one or more monochromatic laser beams. Forming of the image can include illuminating the object with at least a part of the one or more monochromatic laser beams. The reference beam and the illumination beam can include laser beams corresponding to RGB colors.

In some embodiments, the imaging pupil can be selected and the masking can be performed so as to yield a desired dimension and orientation of the exit pupil. The exit pupil can be dimensioned to provide a viewable area that covers both of the viewer's eyes. The exit pupil's location can be adjustable relative to the viewer. The exit pupil can be scanned relative to the viewer so as to yield an effectively larger viewable area. The exit pupil can be rotated relative to the viewer so as to yield an effectively larger viewable area.

In some embodiments, forming of the image and generating of the projectable image can be performed so that their respective images are formed to compensate for loss of resolution due to the masking. The image can be formed with non-uniform magnification.

Various embodiments described herein relate to a 3-D system. The 3-D system comprises a camera system and a projection system.

The camera system includes an imaging sensor having an imaging plane; a coherent light source configured to provide a reference beam; an illumination component configured to provide an illumination beam having a phase relative to the reference beam; and an optics assembly having an imaging pupil and configured to receive reflection of the illumination beam from an object and form an imaging beam capable of forming an image of the object at the imaging plane. The optics assembly is further configured to combine the imaging beam and the reference beam so as to yield an interference of the image and the reference beam, the imaging pupil and the reference beam forming separate features in a Fourier transform of the interference. The camera system further comprises an output component configured to generate data representative of the interference.

The projection system includes an input component configured to receive information representative of the data, a modulation device configured to receive the information and generate a projectable image, an illumination component configured to provide a coherent illumination beam to the projectable image so as to yield a projection beam, a separator configured to separate the projection beam into a plurality of components corresponding to the separate features, a mask configured to allow passage of a selected one of the plurality of components and block other portions of the projection beam, and an optics assembly configured to project the selected portion of the projection beam to an exit pupil so as to form a 3-D image of the object when viewed by a viewer at the exit pupil.

In some embodiments, the optics assembly in the projection system can include a telecentric magnifier configured to provide a desired exit pupil size. The desired exit pupil size can include a size that substantially matches the imaging pupil. The telecentric magnifier can be configured such that the image formed at the exit pupil corresponds to a virtual image when viewed at the exit pupil. The telecentric magnifier can include a field lens positioned and configured so as to provide a desired eye relief distance from the exit pupil. The imaging sensor can include an intensity imaging sensor. The intensity imaging sensor can include a CCD sensor or a CMOS sensor. The modulation device can include an intensity modulation device. The intensity modulation device can include an LCOS, LCD or a DLP based device. The intensity modulation device can include a reflective intensity modulation device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 14 shows that in some implementations, increased effective pupil size can be provided by a plurality of different projection mask orientations by, for example, scanning of masks in the camera and projector and thereby sampling additional portions of the complex pupil.

FIGS. 15A-15D show non-limiting examples of how a plurality of projection mask orientations can be achieved by different scanning methodologies to yield a desirable configuration for one or more viewers.

Figure 1:
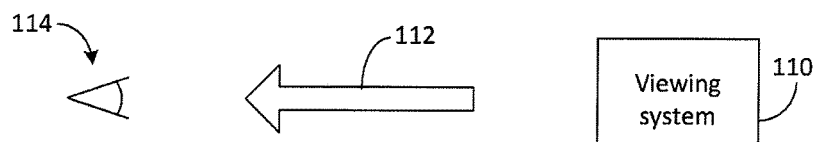
FIG. 1 schematically depicts a system having an imaging component configured to form a complex image of an object and a viewing component configured to allow viewing of a 3-D image of the object based on the complex image.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In addition, while specific embodiments of, and examples of systems and methods for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

DETAILED DESCRIPTION OF SOME EMBODIMENTS

The headings provided herein, if any, are for convenience only and do not necessarily affect the scope or meaning of the claimed invention.

Provided herein are various examples of methodologies and systems for obtaining a complex image of an object, obtaining data representative of such an image, and generating a 3-dimensional (3-D) view of the object based on such data. FIG. 1 schematically depicts an example of such a system, where an object 102 is imaged by an imaging system 100 by an optical signal 204 having both intensity and phase information. The imaging system 100 can be configured to form a complex image of the object 102 and to generate data representative of such a complex image. Examples of such a complex image and data are described herein in greater detail.

FIG. 1 further shows that the imaging system 100 can be configured to transfer (line 106) the complex data to a viewing system 110. Non-limiting examples of how such a transfer of data can be implemented are described herein in greater detail. The viewing system 110 is depicted as generating a 3-D representation (112) of the object for viewing by a viewer 114. Examples of how such a 3-D representation can be generated are described herein in greater detail.

Figure 2:
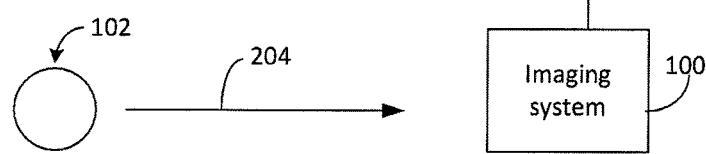
FIG. 2 shows that in some implementations, the imaging component can include a camera, and the viewing component can include a projector.
Figure 2:
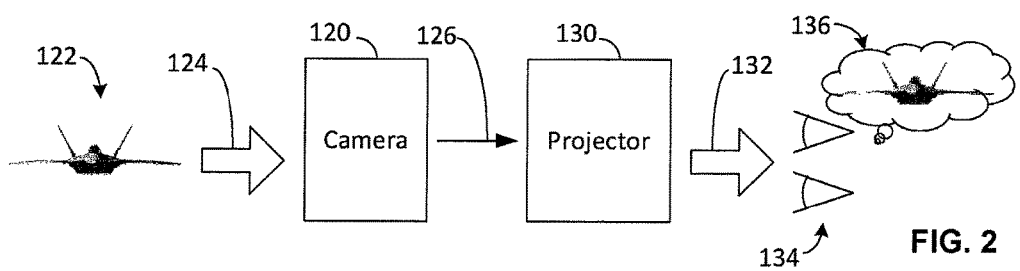

FIG. 2 shows that in some implementations, the imaging system 100 of FIG. 1 can include a camera 120 having an intensity-based imaging sensor, and the viewing system 110 can include a projector 130. The camera 120 is depicted as forming an image of an object via an optical signal having both intensity and phase information. The camera 120 can then output a signal that can be transferred (arrow 126) to the projector 130. The projector 130 is depicted as generating (arrow 132) a 3-D image 136 of the object 122 for one or more viewers 134.

Figure 3A:
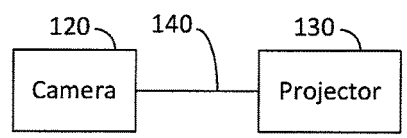
FIGS. 3A-3D schematically depict some non-limiting examples of how information about the complex image can be transferred from the camera to the projector.
Figure 3B:
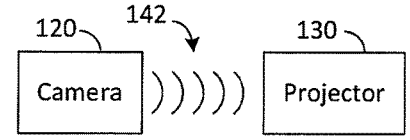

As described herein, a signal transferred between a camera and a projector can be in a number of different forms, and can also be achieved in a number of different manners. By way of non-limiting examples, FIG. 3A shows that in some embodiments, a signal from a camera 120 can be transferred to a projector 130 via path that includes a wire 140 (transmission line, cable, etc.). Such a wire path 140 can allow the camera 120 and the projector 130 to be in close proximity to each other, or separated by a distance. FIG. 3B shows that in some embodiments, a signal from a camera 120 can be transferred to a projector 130 wirelessly (142). In some implementations, transfer of signal between the camera 120 and the projector 130 can include a combination of wire-based and wireless paths.

Figure 3C:
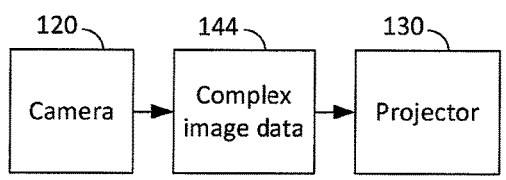

FIG. 3C shows that in some implementations, the foregoing signal generated by the camera 120 can be in a form of formatted complex image data 144. In some embodiments, such data can include digital data representative of a complex image recorded by the camera 120.

Figure 3D:
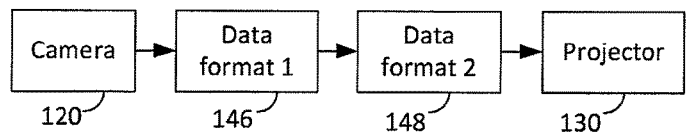

FIG. 3D shows that in some implementations, the foregoing data output by the camera 120 can be converted one or more times before reaching the projector 130. In the example shown, an output of the camera 120 is depicted as being in a first format 146 which is then converted to a second format 148 before being provided to the projector 130. Other configurations can also be implemented.

In some implementations, one or more of the example configurations of FIGS. 3A-3D can include one or more computing devices that facilitate transfer, processing, and/or conversion of signals or data between the camera 120 and the projector 130. In other implementations an image obtained by a camera is projectable by a projector as described herein without the need of a computing device to provide processing of the signal from a detector in the camera such as for example, digitally transforming the signal into frequency space (e.g., via digital Fourier transform), spatial frequency manipulation (e.g., filtering or masking of frequency components), and/or digital transforming from frequency space into spatial coordinates (e.g., via digital inverse Fourier transform), Instead the camera and the projector can be configured together as a closed-circuit system wherein the signal from the optical detector in the camera is fed into a spatial light modulator of the projector without significant single processing such as described above.

Figure 4:
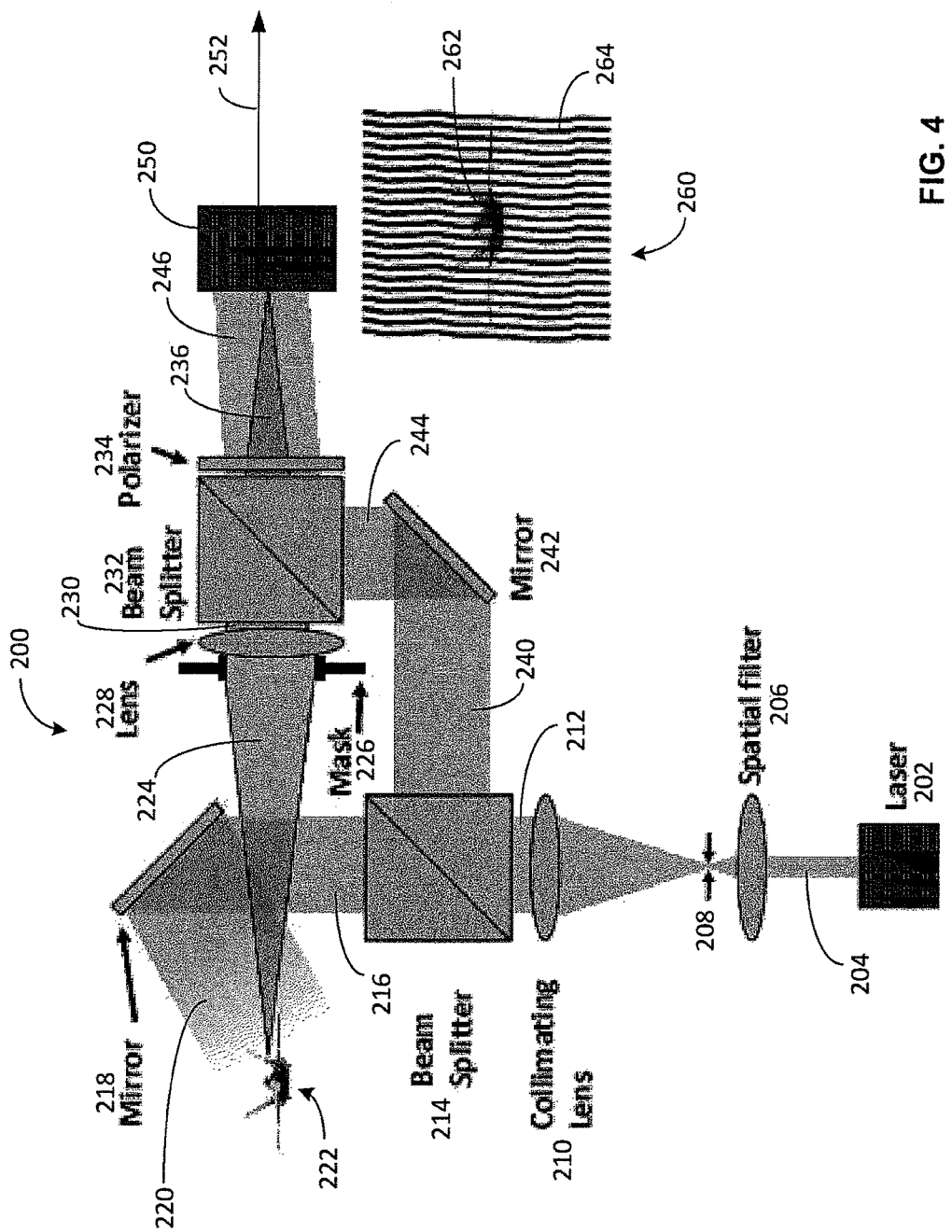
FIG. 4 shows an example camera system that can be configured to generate an output representative of a complex image formed at an intensity imaging sensor.

FIG. 4 shows an example configuration of a camera 200 that can form a complex encoded image 260 of object 222. Such an image can be formed at an imaging plane of an intensity-based imaging sensor 250 as follows. A coherent light beam 204 from a source 202 such as a laser is depicted as passing through a spatial filter assembly 206 (e.g., converging lens and an aperture 208) so as to yield a spatially filtered diverging beam. The diverging beam is depicted as passing through a collimating lens 210 so as to yield a broadened collimated beam 212.

The collimated coherent beam 212 can pass through a beam splitter 214 so as to yield a reference beam 240 and an illumination beam 216. The illumination beam 216 can be redirected (e.g., by a mirror 218) into a beam 220 directed at the object.

An example ray tracing resulting from reflection of the illumination beam 220 from a portion of the object 222 is depicted. A ray envelope 224 is depicted as diverging from the object 222. The diverging ray envelope 224 is depicted as being provided to an assembly of imaging optics (e.g., an aperture or mask 226 and an imaging lens 228) so as to yield a converging ray envelope 236 focused at an imaging plane of the imaging sensor 250. The imaging lens 228 images the object onto the imaging sensor 250. In some embodiments, for example, the object and the imaging sensor are at conjugate planes or nearly conjugate planes. This imaging sensor may comprise an array of detectors such as a CCD or CMOS detector array. The aperture 226 can be configured to include a number of shapes (e.g., a rectangular shaped aperture) so as to yield a defined converging ray envelope 236.

The reference beam 240 emerging from the beam splitter 214 can be directed to the beam splitter 232 (e.g., by a mirror 242) as a beam 244. At least a portion of the reference beam 244 can be redirected to the imaging sensor 250 as a reference beam 246 along with the ray envelope 236.

The foregoing example configuration can yield the intensity image 260 that includes phase information 264 encoded on interference fringes. The interference fringes may be the result (or produced from) from interference of an intensity image 262 of the object 222 and the reference beam 240. The intensity distribution of such an interference pattern can be recorded by an intensity-based imaging sensor 250 so as to yield an output signal 252. The phase (complex) information is encoded in the interference fringes. As described herein, the complex data can be un-coded by either physical or digital masking in Fourier space.

Figure 5:
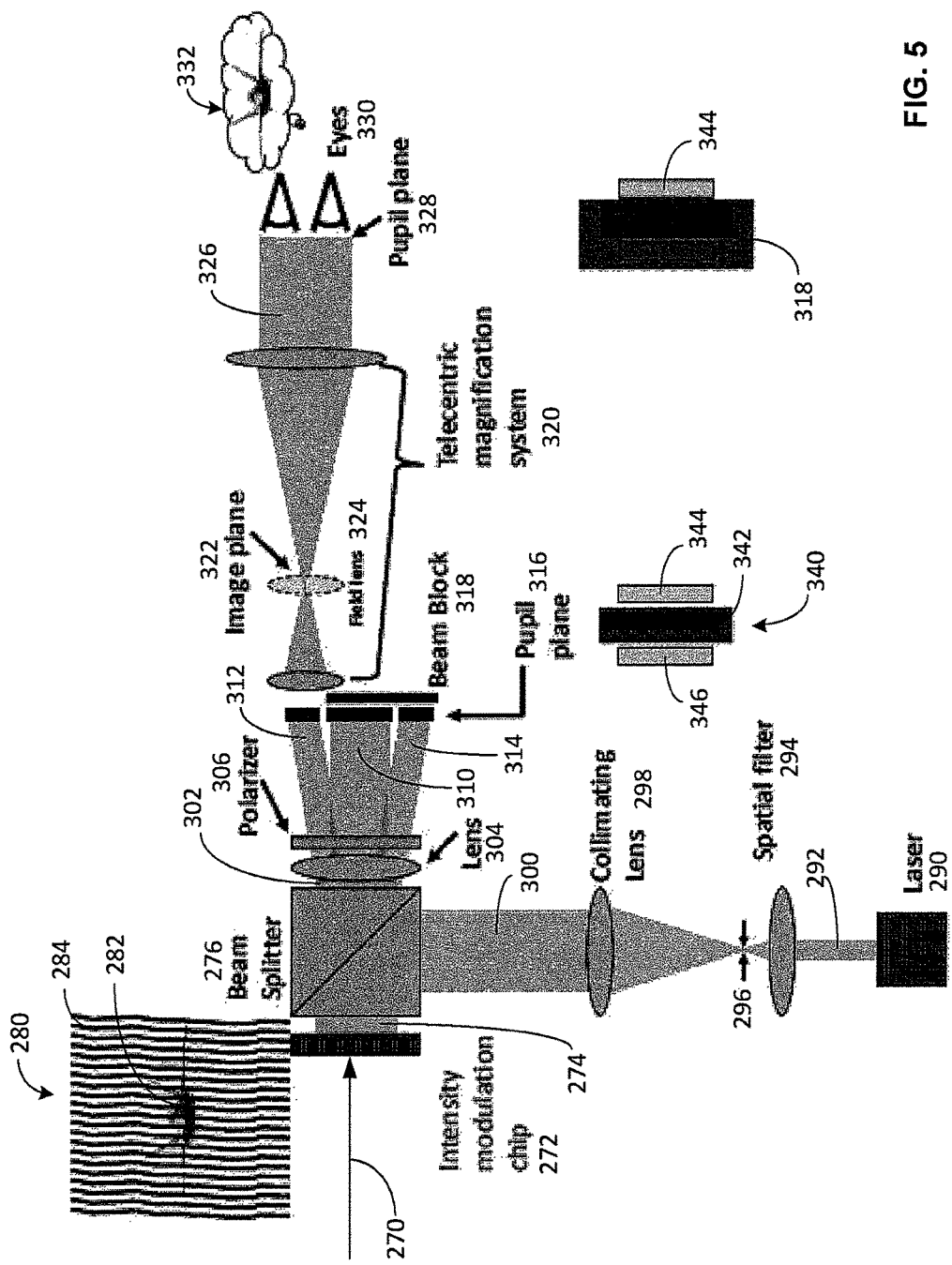
FIG. 5 shows an example projection system that can be configured to receive data representative of the output of the camera system of FIG. 4 and generate a 3-D image for a viewer.

FIG. 5 shows an example configuration of a projector that can project a 3-D image 332 viewable by one or more eyes 330 positioned at or near a pupil plane 328. An input signal 270 is depicted as being provided to an intensity modulation device 272 such as an LCOS, LCD, DLP, or other type of spatial light modulator. The input signal 270 can be a signal received directly from a camera (e.g., a camera 200 of FIG. 4 and the output signal 252 thereof), a signal processed by one or more computing devices, a signal from a media, or some combination thereof.

In some implementations, an image formed on the intensity modulation device 272 based on the input signal 270 can be substantially the same as a corresponding image formed on the camera's imaging sensor. For such a configuration, magnification of the pixels between the imaging sensor and the modulation device can be substantially unity. However, such a unity-magnification is not a requirement; and appropriately configured optics can be utilized to address any mismatches (e.g., in the shapes, sizes, aspect ratios, etc.) of the pixels in the imaging sensor in the camera and the pixels of the spatial light modulator in the projector. Nevertheless, in such embodiments, the spatial light modulator reproduces the intensity image formed on the camera sensor even though the reproduced image may not be identical but may include variations.

An intensity image (e.g., an image 280 that includes phase information 264 encoded in interference fringes that result from interference of an intensity image 282 of an object and the reference beam of a camera) formed on the modulation device 272 can be illuminated by a broadened and collimated laser beam 274 supplied by a laser 290 via a beam splitter 276. As shown, coherent light beam 292 from the laser 290 can be passed through a spatial filter assembly 294 (e.g., converging lens and an aperture 296) so as to yield a spatially filtered diverging beam. The diverging beam is depicted as passing through a collimating lens 298 so as to yield a broadened collimated beam 300 that enters the beam splitter 276 to yield the illumination beam 274. Although the beam 300 is shown as collimated by collimating lens 298, collimation is not necessary.

Reflection of the illumination beam 274 modulated by the modulation device 272 is shown to be directed back through the beam splitter 276 so as to yield a projection beam 302. Although the example configuration of FIG. 5 is in the context of a reflective intensity modulation device, it will be understood that similar projection can also be achieved by an appropriately illuminated transmissive intensity modulation device.

Referring to FIG. 5 and the insets therein, the projection beam 302 can be separated into different spatial components. For example, a central component 342 and side lobes 344, 346 that are the Fourier transform 340 of the interference image 280 are produced by a lens 304. As is well known, a lens can yield the Fourier transform of an object as is the case here. FIG. 5 further shows a polarizer 306 accompanying this lens. The polarizer provides polarization but is not necessary. In some embodiments, for example, other polarization optics and/or a laser that output a polarized laser is used. The polarizer can also be useful to control overall intensity levels. Such a separation can be configured so that the resulting spatial components 310, 312, 314 are sufficiently separated at a pupil plane 316. The components 310, 312, 314 include a central lobe 310 comprising the autocorrelation of the complex pupil information, one side lobe 312 that is the complex pupil information, and the opposite side lobe 314 that is the complex conjugate. Moreover, the lens 302 provides that the Fourier components of the object are at the pupil plane 316. The example separated components 310, 312, 314 correspond to the center lobe 342 and the side lobes 344, 346, respectively.

A beam block 318 is shown to block passage of the separated components corresponding to the center lobe 342 and one side lobe (346) and allowing passage of the separated component corresponding to the other side lobe 344. By isolating one of the side lobes 344, complex information and phase can be extracted therefrom. As described in the herein-referenced application Ser. No. 13/308,110, such a side lobe can include substantially full complex information for a selected spatial frequency range of the object.

In some implementations, a relay assembly 320 or projection optics can be provided so as to direct the passed component 312 to the pupil plane 328. The relay assembly also images the complex pupil plane 312 forming the pupil plane 328 at the conjugate location. The example relay assembly 320 can include a plurality of lenses configured and positioned so as to provide functionalities that include resizing of the passed beam 312 and presenting to the eye(s) 328, a pupil approximately the same size as the camera's entrance pupil (226 in FIG. 4), and making the image a virtual image, which is imaged by lens of a viewer's eye onto their retina. Combined, these two functionalities can yield a viewing situation that substantially replicates an observer's eye(s) being positioned at the camera location. In some embodiments, the relay assembly 320 provides demagnification, reducing the size of the image and pupil although magnification systems that enlarge may also be used. Accordingly, the relay assembly 320 can be configured to provide the desired magnification or demagnification. However, in various embodiments, if the system magnifies the pupil, the image will be reduced/minified and if the system de-magnifies or reduces the pupil, the image will be magnified. In some embodiments, the relay assembly is telecentric.

FIG. 5 further shows that in some embodiments, an optional field lens 324 can be provided at an image plane within the magnification/de-magnification system 320. Such a field lens can be configured to place the pupil plane at a selected distance from the last telecentric lens so as to allow, for example, control of eye relief distance and the last lens' size. In some embodiments, the field lens 324 can be part of a zoom lens assembly so as to allow adjustability of one or more of the foregoing features.

The lens assembly 320 and/or the field lens 322 can include more lenses than shown and can be configured differently. More complex lens systems that may integrate the functionalities of magnification or minification of image and pupil size as well as providing suitable eye relief by establishing the longitudinal position of the pupil may be used. Such systems may have one or more moving components.

Figure 6:
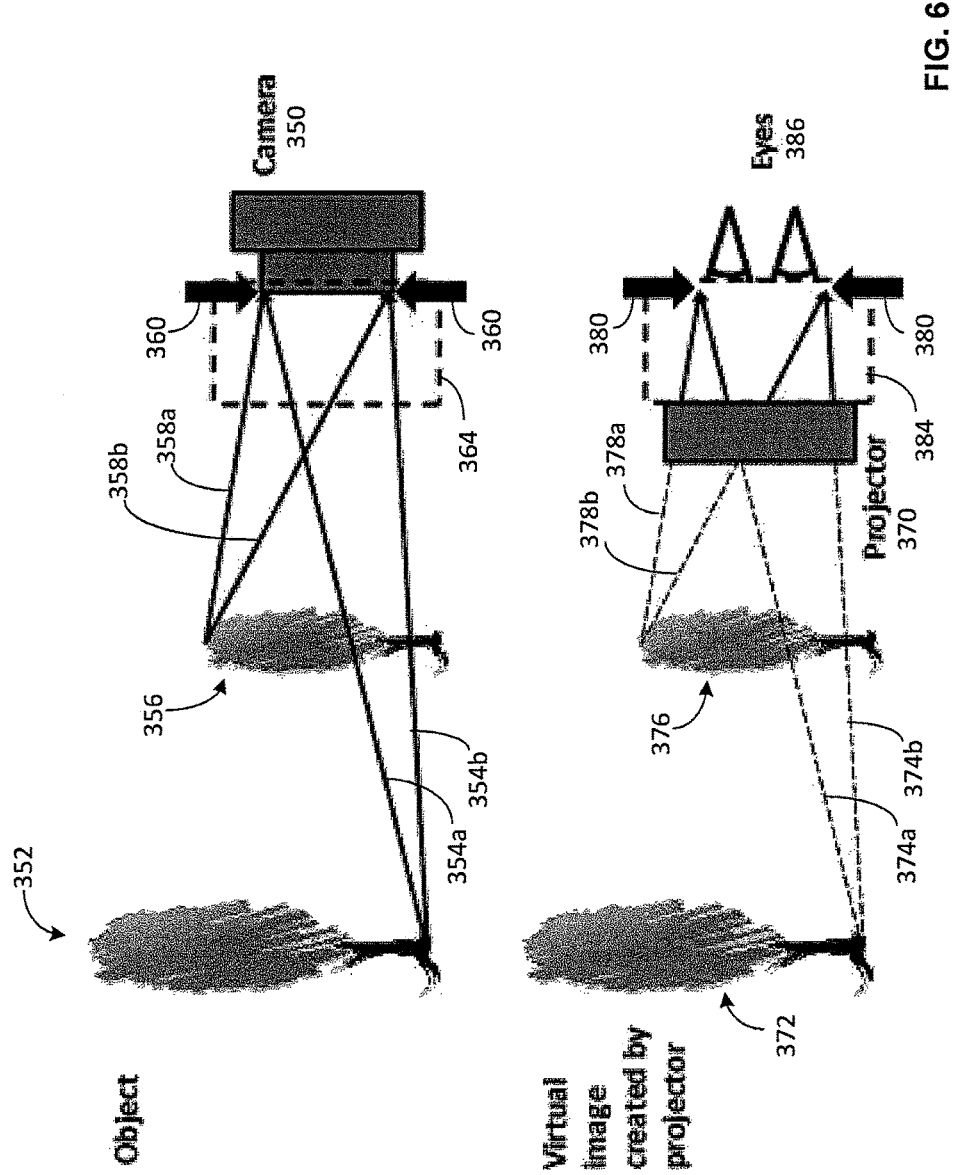
FIG. 6 shows that in some implementations, camera and projection systems such as those of FIGS. 4 and 5 can be configured so that a projection provided to a viewer includes a virtual image that substantially replicates what the viewer would see if positioned at the exit pupil plane of the camera system.

FIG. 6 shows a comparison of a camera 350 and a projector 370 having one or more features as described herein. The camera 350 is shown to image objects 352, 356 through an aperture 360. Such an image can include an interference of an intensity image and a reference beam so as to yield a complex image that is projectable by the projector 370.

As described herein, such a projector can project the image obtained by the camera 350 and yield virtual images 372, 376 corresponding to the objects 352, 356. In some implementations, such a projection of the image can substantially replicate the image-formation of the original objects 352, 356, including depth information, such that the viewed images 372, 376 can desirably appear as being in 3-D.

In the example of FIG. 6, formations of images for the objects 352, 356 are depicted by rays 354a and 354b and 358a and 358b entering the camera's aperture 360. Similarly, formations of virtual images 372, 376 are depicted by rays 374a and 374b and 378a and 378b on the left side of the example layout, with the same rays 374 and 378 converging to their respective points at an exit pupil 380 of the projector 370. In some implementations as described herein, the camera 350 and/or the projector 370 can be configured so that the projector's optics yield an exit pupil configuration that substantially mimics the rays entering the camera pupil. In FIG. 6, such a similarity between the camera pupil and the projector exit pupil arrangements is depicted by similar rays within respective regions 364 and 384. Such a configuration can desirably make it seem like the viewer's eye(s) positioned at or near the projector's exit pupil is(are) at or near the camera's pupil location.

Figure 7:
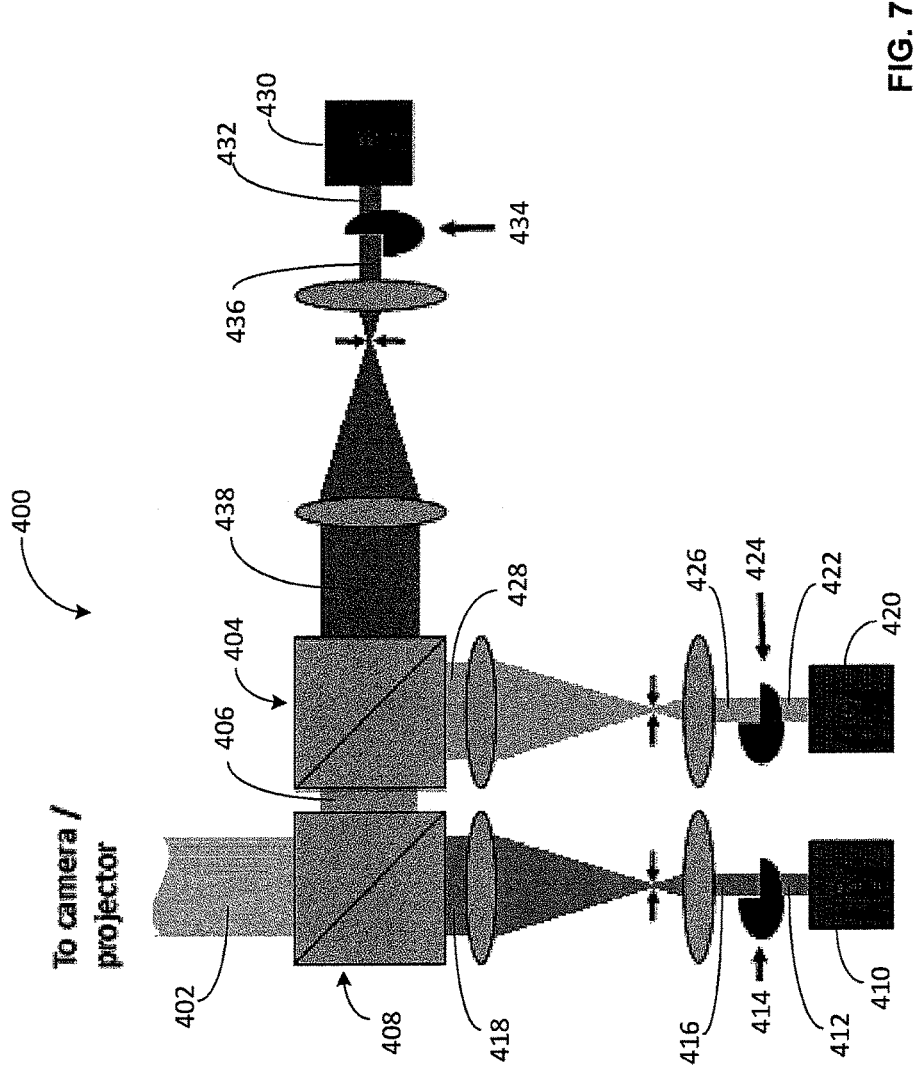
FIG. 7 shows that in some embodiments, the camera and projection system can be configured to operate in a color mode.

In some implementations, a camera and/or a projector having one or more features as described herein can be configured to provide color functionality. FIG. 7 shows an example configuration 400 that can facilitate such a functionality for either or both of the camera and the projector. The example configuration is described in the context of RGB; however, it will be understood that other color combinations are also possible.

A coherent light source 410 is depicted as generating an output beam 412 having a red (R) component. A shutter assembly 414 comprising a shutter can be configured to control passage of the output beam 412 so as to yield a controlled red beam 416, which in turn can be broadened into a collimated beam 418 by a spatial filter and collimating lens assembly. In some embodiment, the beamsplitters may be dichroic. For example, the beamsplitter 408 may include a dichroic filter that passes red light but reflects blue and green light. Similarly, the other beamsplitter 404 may be include a color filter in some embodiments.

Similarly, a coherent light source 420 is depicted as generating an output beam 422 having a green (G) component. A filter/shutter assembly 424 (e.g., a dichroic filter and a shutter) can be configured to control passage of the output beam 422 so as to yield a controlled green beam 426, which in turn can be broadened into a collimated beam 428 by a spatial filter and collimating lens assembly. Similarly, a coherent light source 430 is depicted as generating an output beam 432 having a blue (B) component. A filter/shutter assembly 434 (e.g., a dichroic filter and a shutter) can be configured to control passage of the output beam 432 so as to yield a controlled blue beam 436, which in turn can be broadened into a collimated beam 438 by a spatial filter and collimating lens assembly.

In the example shown, the blue beam 438 and the green beam 428 are shown to be combined by a beam splitter 404 so as to yield a GB beam 406. The GB beam 406 is further combined with the red beam 418 by a beam splitter 408 so as to yield an RGB beam 402. The RGB beam 402 can then be utilized as a reference/illumination beam for imaging (e.g., similar to the beam 212 of FIG. 4) and/or as an illumination beam for projection (e.g., similar to the beam 300 of FIG. 5).

In some implementations, synchronization of the three example colors (R, G, B) by a camera and/or a projector can be achieved in a number of ways. For example, the three colors can be pulsed (e.g., by rotating shutters) and provided for imaging with a single sensor and/or for projection with a single intensity modulation device that records the different colors at different times. In another example, the three colors can remain on with their respective filters being synchronized with the camera and/or the projector. In yet another example, the three colors can overlap with three separate imaging sensors and/or three separate intensity modulation devices. In some embodiments, some or all of the foregoing can be combined. Other configurations can also be implemented.

In some implementations, an imaging and projection system having one or more features as described herein can be configured to provide a number of other features. Some non-limiting examples are described in reference to FIGS. 8-10. Such features are described in the context of projections; however, it will be understood that corresponding imaging systems can be configured appropriately to accommodate such features.

Figure 8:
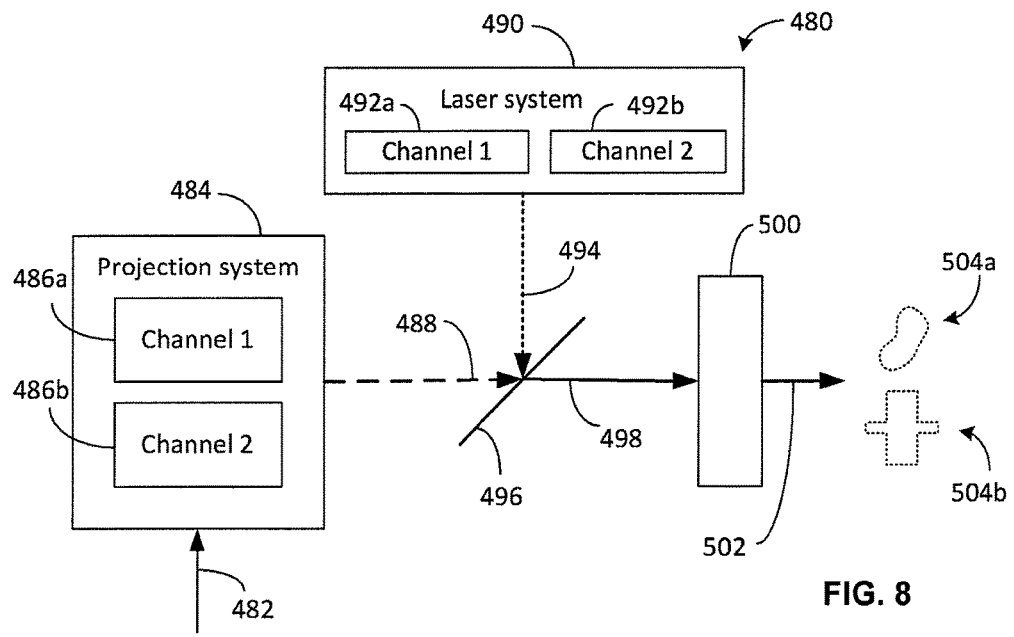
FIG. 8 shows that in some embodiments, the camera and projection system can be configured to allow imaging and 3-D viewing of a plurality of distinct objects.

FIG. 8 shows that in some implementations, a projection configuration 480 can be provided to allow projection of a plurality of different images (e.g., 504a, 504b) to be viewable by a viewer (not shown). Such a capability can be facilitated by a projection system 484 having a plurality of channels 486a, 486b configured to receive and process respective portions of an input 482. To facilitate illumination and projection of such channels (e.g., two separate images formed on two separate intensity modulation devices), a coherent light source 490 having a plurality of light output channels 492a, 492b (e.g., different colors, different synchronizations, etc.) can provide respective illumination beams collectively depicted as 494. Reflections of the illumination beams from their respective intensity modulation devices are collectively depicted as an arrow 488, and such beams can pass through a beam splitter 496 so as to yield a projected beam 498. The projected beam 498 is shown to pass through an optics assembly 500 so as to yield an output that includes the two example viewable images 504a, 504b. In some embodiments, such a configuration could increase the field-of-view.

In some implementations, the two example images 504a, 504b can correspond to two separate objects imaged by a single camera (e.g., at separate times). In other implementations, the two images 504a, 504b can correspond to two separate objects imaged by two separate cameras. Such separate cameras can be at different locations, and the two images 504a, 504b can be a consolidation and presentation of the two objects into a single viewable image.

Figure 9:
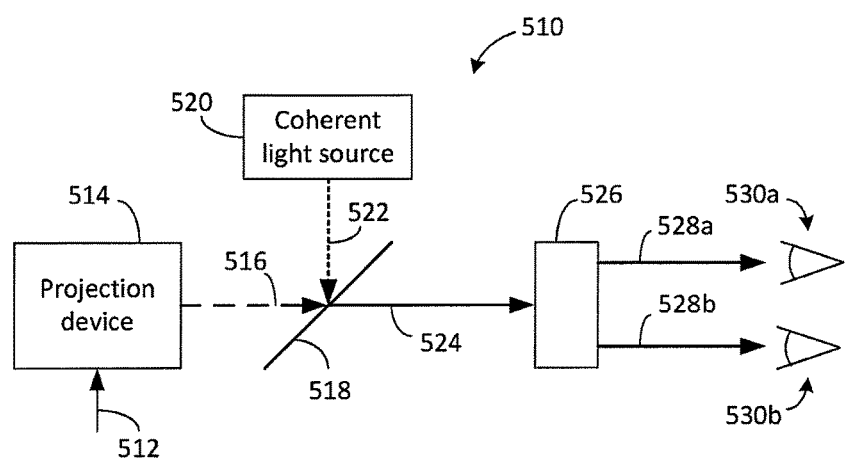
FIG. 9 shows that in some embodiments, the projection system can be configured to allow 3-D viewing by plurality of viewers.

FIG. 9 shows that in some implementations, a projection configuration 510 can be provided so as to allow viewing by a plurality of viewers. Such a capability can be facilitated by a projection system 514 configured to receive and process an input 512. To facilitate illumination and projection of an image formed by the projection system 514, a coherent light source 520 can provide an illumination beam depicted as 522. Reflection of the illumination beam from an intensity modulation device is depicted as an arrow 516, and such a beam can pass through a beam splitter 518 so as to yield a projected beam 524. The projected beam 524 is shown to pass through an optics assembly 526 so as to yield images 528 viewable by two or more viewers 530. In some embodiments, the optics assembly 526 may comprise a "smart" system that actively finds the viewer's eyes and aims the pupil at those eyes. In other configurations the optics assembly 526 could be a "dumb" system that creates fixed zones for viewers.

In some implementations, the example images 528 can include the same content, such that information about the same imaged object can be distributed to at least one viewer 530. In other implementations, the example images 528 may not be the same, and can include different content (for example, associated with different objects). In some embodiments, such a configuration could mathematically extrapolate content from a real imaged viewpoint to a virtual viewpoint. Extrapolation can be of intensity and/or phase.

Figure 10:
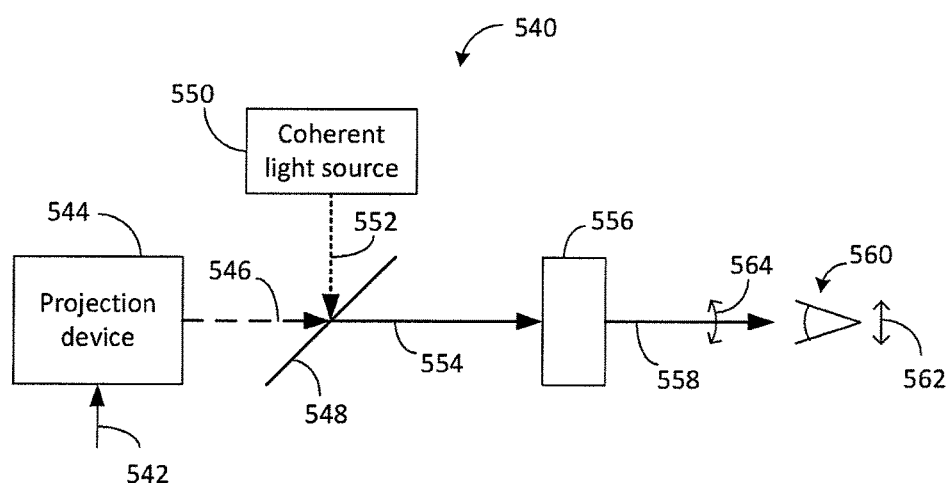
FIG. 10 shows that in some embodiments, the projection system can be configured to accommodate motions of a viewer.

FIG. 10 shows that in some implementations, a projection configuration 540 can be provided so as to allow adjustability of a viewing orientation. Such a capability can be facilitated by a projection system 544 configured to receive and process an input 542. To facilitate illumination and projection of an image formed by the projection system 544, a coherent light source 550 can provide an illumination beam depicted as 552. Reflection of the illumination beam from an intensity modulation device is depicted as an arrow 546, and such a beam can pass through a beam splitter 548 so as to yield a projected beam 554. The projected beam 554 is shown to pass through an optics assembly 556 so as to yield an image 558 viewable a viewer 560.

In some situations, the viewer's position and/or orientation relative to an exit pupil of the projection system can vary for a number of reasons. In FIG. 10, such a variation is depicted by an arrow 562. In some implementations, the optics assembly 556 can be configured so as to adjust (arrow 564) the projected image 558 to accommodate such viewer variations. In some embodiments, for example, the optics assembly 526 may comprise a "smart" system that actively finds the viewer's eyes and aims the pupil at those eyes. Such a design may be useful for a home consumer that moves around on their sofa as opposed to sitting relatively still directly in front of a monitor.

Figure 11:
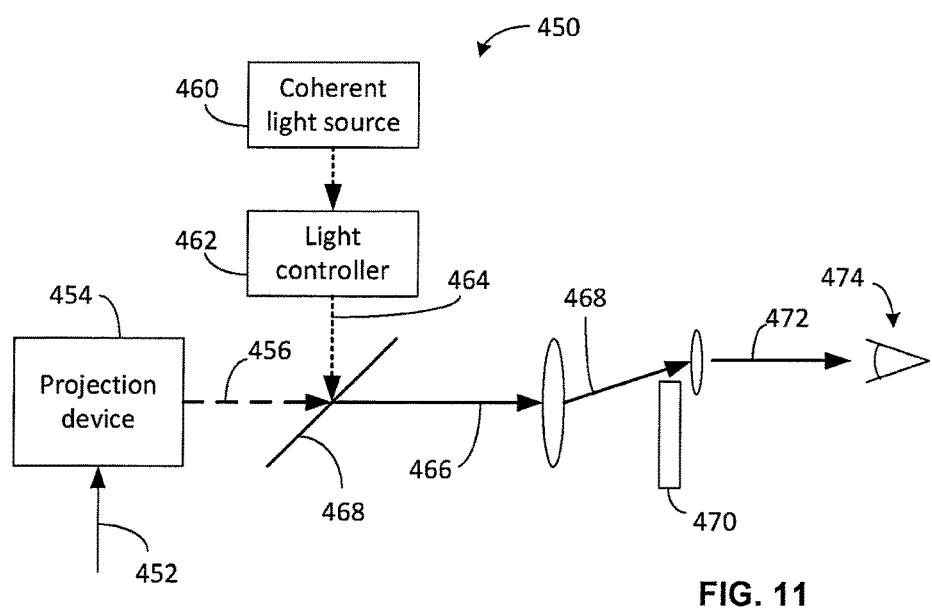
FIG. 11 shows an example projection configuration where a mask can be provided to separate a complex beam component from the non-complex information and a complex conjugate component so as to project a 3-D image.

FIG. 11 is a schematic representation of the example projection configuration described in reference to FIG. 5. In FIG. 11, a projection configuration 450 can be provided with a beam block 470 to yield a desired masking functionality that allows viewing of an image having a selected a complex beam component and not the non-complex information and a complex conjugate component. To obtain such an image, a projection system 454 can be configured to receive and process an input 452. To facilitate illumination and projection of an image formed by the projection system 454, a coherent light source 460 can provide an illumination beam 464 (via a light controller component 462). The light controller component 462 may comprise, for example, as spatial filter and a collimator. Reflection of the illumination beam from an intensity modulation device is depicted as an arrow 456, and such a beam can pass through a beam splitter 468 so as to yield a projected beam 466. The projected beam 466 is shown to pass through a separation lens so as to yield a plurality of separated beam components. A selected one (468) of such beam components is depicted as being allowed to pass by the beam block 470 as a selected beam 472 viewable by a viewer 474.

As described herein and in U.S. application Ser. No. 13/308,110, a pupil mask of a camera, along with a reference beam (representative of a delta-function in frequency or Fourier space) can yield a three-lobe structure in frequency (e.g. Fourier) space. Since the spatial light modulator in the projector mimics the image produced by the camera, the output of the spatial light modulator will have a similar frequency space distribution comprising a three-lobed structure. Accordingly, the mask in the camera can influence the selection of the mask in the projection system shown in FIG. 5 that is used to selectively pass a portion of the projection beam. The projection system's mask configuration can also depend on factors such as the camera's f/# of the collected light, wavelength of light, pixel pitch and count of the camera's sensor, the projector's intensity modulation device, and/or magnification of the projector's optics.

In the examples described in reference to FIGS. 4 and 5, a rectangular strip shaped mask can be included in the camera. This rectangular aperture will produce a spatial frequency distribution with a central rectangular component and rectangular side lobes. A similar three-lobed spatial frequency distribution is also reproduced by the spatial light modulator in the projector. Accordingly, masking of the projected beam in the projector can include an aperture configured to operate on a frequency distribution having a central rectangular component and rectangular side lobes. For the example shown in FIG. 5, the beam block 318 has an edge that allows a component corresponding to one side lobe to pass while blocking the remainder.

Figure 12:
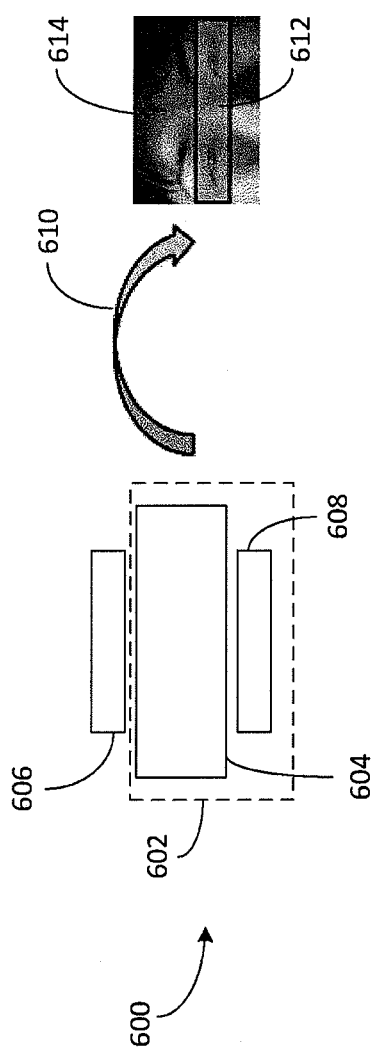
FIG. 12 depicts an example of a projection mask that can be configured to yield an exit pupil that enables projection of a 3-D image by selectively allowing a complex beam component and not the non-complex information and a complex conjugate component to propagate to one or more eyes of a viewer.

FIG. 12 schematically depicts a masking configuration 600 corresponding to the foregoing example. A beam block 602 (318 in FIG. 5) is depicted as blocking projected beam components corresponding to a central lobe 604 and a side lobe 608 and allowing passage of a component corresponding to the other side lobe 606. The component allowed to pass is then delivered (610) to an exit pupil 612 where a viewer 614 is positioned.

FIG. 12 shows the horizontally oriented side lobe 606 (having major axis along the horizontal direction) that is permitted to pass and a horizontally oriented pupil for the projector in coordinate space. This pupil is wider in the horizontal direction than in the vertical direction. Likewise, in the example shown, the exit pupil's size and shape can accommodate left-right 3-D image cues when the viewer's eyes are within the viewable area. However, the same exit pupil size and shape can have a restricted viewable area and orientation provided for the viewer 614. In some implementations, it may be desirable to provide different exit pupil configurations for different viewing needs or preferences.

As described herein, shape and size of such an exit pupil can depend on how the projector mask is configured. Accordingly, a masking configuration of a projection system can be selected to provide a desired exit pupil configuration. Moreover, such an exit pupil configuration can depend on the size and shape of the aperture and pupil on a corresponding camera system.

Figure 13:
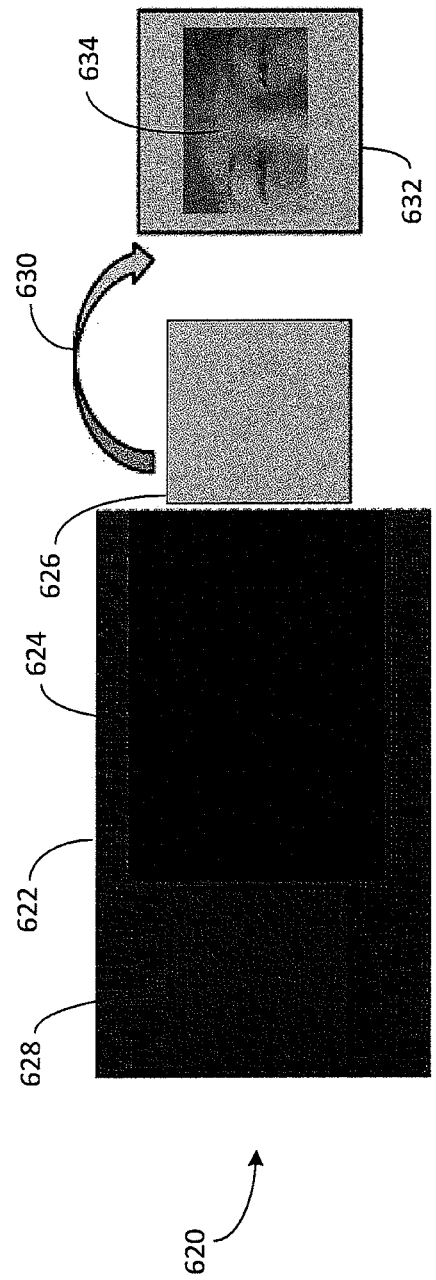
FIG. 13 shows an example of a projection mask and sampling configuration that can yield a larger area from which the 3-D image can be viewed.

FIG. 13 shows an example of a masking configuration 620 where an exit pupil 632 is enlarged for a viewer 634. Such an enlarged exit pupil can correspond to an enlarged side lobe 626 whose corresponding projected component is delivered (630) to the exit pupil 632. The central lobe 624 and the other side lobe 628 are depicted as being blocked by a mask 622. The enlarged lobes can be accommodated by an appropriately enlarged mask or pupil on the camera.

As described herein, such an enlargement of the exit pupil can accommodate a number of viewing needs or preferences. However, in the foregoing example of an enlarged exit pupil configuration, the size of such an enlarged pupil may be limited by size and pixel-count of an imaging sensor and an intensity modulation device, if a selected imaging and viewing resolutions are desired. Accordingly, other viewing configurations that do not necessarily require larger and higher-pixel-count devices can also be implemented, as shown by way of examples in FIGS. 14 and 15.

FIG. 14 shows an example masking configuration 640 where an exit pupil can vary to advantageously provide an effectively larger viewing area. Such increase viewing area can be provided by translating the camera mask and the mask in the projector in concert in the vertical direction. In certain embodiments, the mask itself is not translated by pupil or aperture translation is accommodated in a different fashion. For example, a mirror system may provide raster scanning of the beam. The projector mask 642 is also depicted as blocking the central lobe 644 and one side lobe 648, and allowing passage of a projected beam component corresponding to the other side lobe 646. Such a component is delivered (650) for different positions of the camera mask to form an exit pupil 652*a-e*, 662*a-e* with increase effective area for viewing for one or more viewers 654, 664.

Accordingly, in some embodiments, such an exit pupil can be produced so as to cover different viewable areas. For example, exit pupils 652*a*-652*e* are depicted as providing a relatively large viewable area for the viewer 654, and exit pupils 662*a*-662*e* are depicted as providing a relatively large viewable area for the viewer 664.

For the first viewer 654, the exit pupil 652*c* can provide left-right 3-D functionality, but may not provide up-down or other 3-D image cues. With the other exit pupils that are above and/or below the example exit pupil 652*c*, such 3-D image cues can be accommodated.

For the second viewer 664 whose viewing orientation is tilted, the center exit pupil 662*c* alone does not fully cover both eyes; and accordingly may not even provide sufficient left-right 3-D functionality. However, with the other exit pupils that are above and/or below the example exit pupil 662*c*, such left-right and other 3-D image cues can be accommodated.

In some implementations, the different viewable projector exit pupils can be adjusted as needed (e.g., by tracking a viewer's eye(s)), or be scanned in a selected manner. In the case of eye tracking, for example, the entire pupil is moved to track the movement of the eye. In the example shown in FIG. 14, a scanning of such an exit pupil can be achieved by, for example, a vertical scan (e.g., cyclic or up-and-down). In some embodiments, such tracking movement or scans can be facilitated by optical, mechanical, and/or electronic elements. For example, tracking or scanning can be achieved via mirrors, spatial light modulators, and/or other mechanical/electronic components.

In some implementations, the foregoing scanning of exit pupils can yield an effectively larger viewing area. Such an enlarged viewing area can provide a number of 3-D image cues such as left-right, up-down, parallax, and motion parallax visual functionalities while utilizing imaging sensors and intensity modulation devices having limited sizes and pixel counts.

FIGS. 15A-15D show non-limiting examples of how scanning of camera aperture and projection exit pupil can be implemented in different configurations. FIG. 15A shows an example configuration similar to that described in reference to FIG. 14, such that a plurality of horizontally oriented rectangular exit pupils 672*a*-672*e* are provided for a viewer 670.

FIG. 15B shows an example configuration where a plurality of vertically oriented rectangular exit pupils 674*a*-674*e* are provided for a viewer 670. In such a configuration, scanning can occur along the left-right direction.

In FIG. 15C, segmentation of scanning exit pupils 676 can be along both horizontal and vertical directions. In such a configuration, scanning can occur by, for example, row-by-row or column-by-column.

FIG. 15D shows that in some implementations, an exit pupil does not need to have a rectangular shape. In the example shown, each exit pupil 678 is depicted as having a hexagonal shape, and such shaped pupils can scan an area to provide desired viewing area for a viewer 670.

In the foregoing examples, masking configurations can be made to yield exit pupils having shapes that leave less uncovered areas when packed together over a larger area. For example, the square shaped pupils 676 of FIG. 15C pack well together to leave less uncovered area than circular shaped pupils. Similarly, the hexagonal shaped pupils 678 of FIG. 15D also pack better than circular shaped pupils (even if such circles are closely packed).

In the examples described in reference to FIGS. 14 and 15, a larger effective viewable area can be provided by projecting a number of exit pupils to different locations in space. In some implementations, a larger effective viewable area can be achieved without having to perform such spatial scans.

Figure 16:
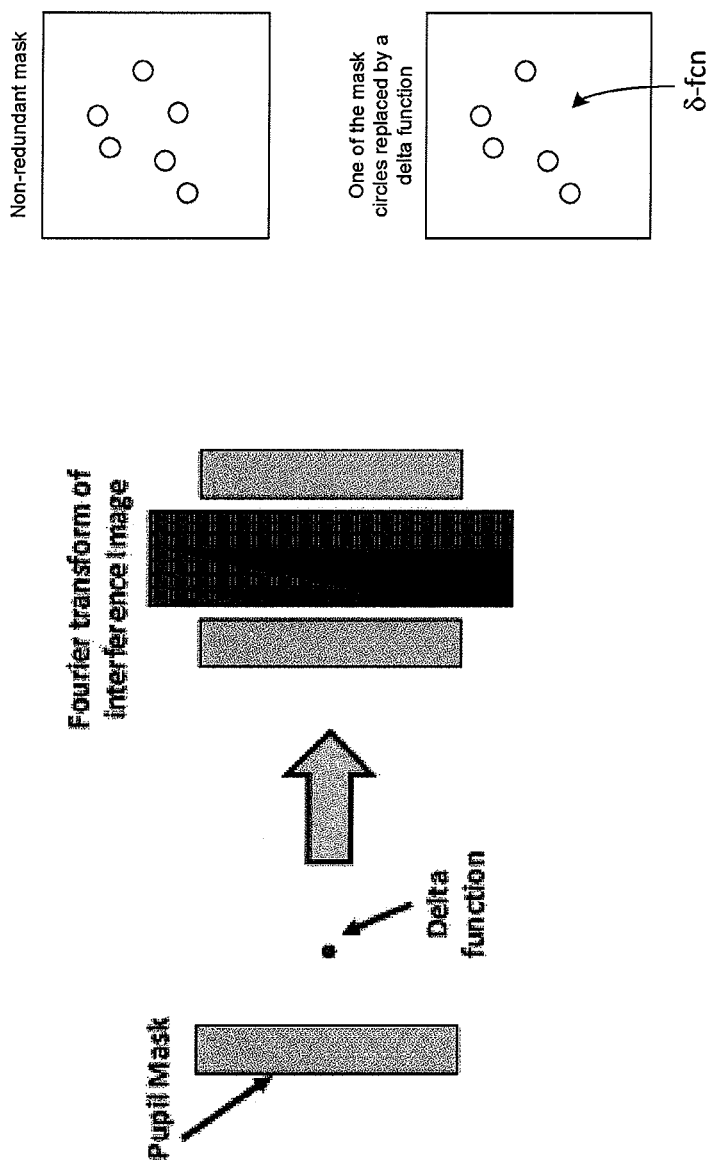
FIG. 16 shows that in some embodiments, other mask shapes and arrangements can be implemented to increase a field of view and/or to facilitate an easier scanning process.

FIG. 16 shows an example masking configuration having one or more non-polygonal shaped apertures such as circular shaped apertures. For reference, a general pupil mask and a delta function yielding a lobe structure in a Fourier representation of an interference image are shown on the left. Such masks and apertures are in the camera and intensity only projector or exist digitally for intensity and phase projectors.

In the example of FIG. 16, masks having a plurality of apertures can be provided for the camera and projector. Such apertures are shown to be arranged in a non-redundant manner (upper panel). The arrangement of the apertures is important. Because the apertures are non-redundant, the features in frequency/Fourier space can be made not to overlap. In the lower panel, one of the circular apertures of a non-redundant array is shown to be replaced by a delta function (representative of interference with a reference beam). Interfering with a reference beam, represented by the delta function, provides phase information. A Fourier representation of the apertures includes a generally similar arrangement of spatial frequency structures for both the case where the circular aperture is replaced by the delta function and is not replace by the delta function. However, when the circular aperture is replaced by a delta function, the Fourier structure corresponding to the replaced circular aperture is absent. See, e.g., "Optical spatial heterodyne interferometric Fourier transform technique (OSHIFT) and a resulting interferometer," James A. Georges III, Proceedings of SPIE, Vol. 6711, Sep. 27, 2007, which is hereby incorporated herein by reference in its entirety. Although circular shaped apertures may be used as shown in FIG. 16, the apertures need not be circular.

Figure 17A:
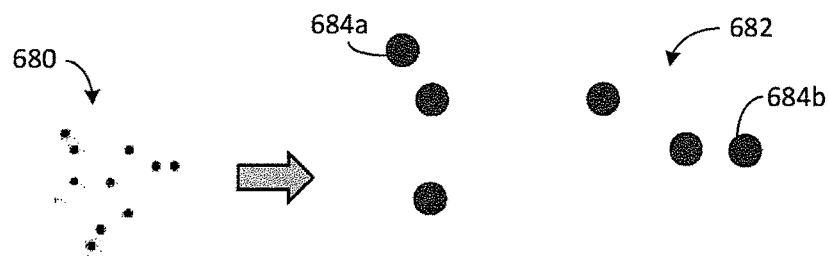
FIGS. 17A-17C shows an example of a rotational scan of a mask pattern comprising a Golay non-redundant array.
Figure 17B:
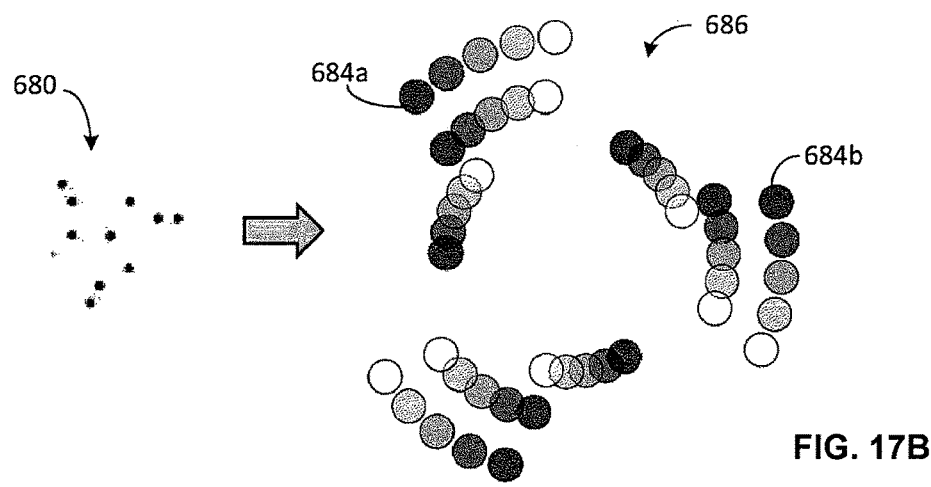
Figure 17C:
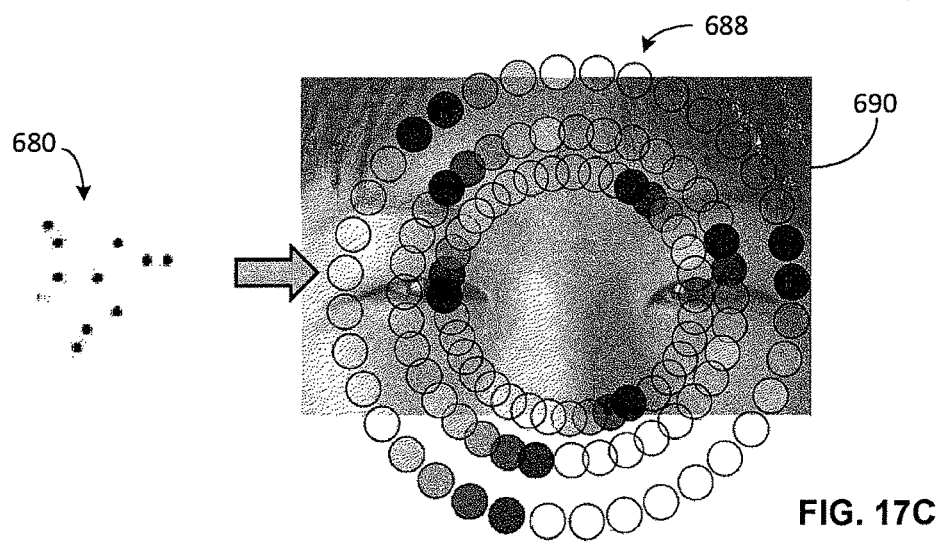

FIGS. 17A-17C show an example of how such non-redundant masking apertures can be implemented with a delta function (e.g., reference beam) to provide phase information and be rotated to yield a larger viewable area. In FIG. 17A, a pattern of apertures 680 about an approximate center can be provided in the camera and the projector. A delta function can be placed at such a center, so as to yield a mask pattern 682 with a plurality of circular shaped masks 684. With the delta function at the center, the reference beam is on-axis and does not need to be rotated.

In the examples of FIGS. 14 and 15, an individual mask (such as an individual circle 684a) can be scanned to cover a larger area. FIG. 17B shows that in some implementations, a mask pattern in the camera and projector can be rotated instead of having an individual mask be scanned. Such a rotation is shown to yield a series of overlapping and/or non-overlapping masks.

One can see that such a configuration can benefit by having to deal with one simple rotational motion. Further, a mask pattern can be selected so that upon rotation, the resulting series of masks cover a desired area. For example, FIG. 17C shows a coverage 688 that can result from an approximately full rotation of the mask pattern 682 in the camera and projector. Such a coverage is shown to provide a relatively large viewable area for a viewer 690.

Figure 18:
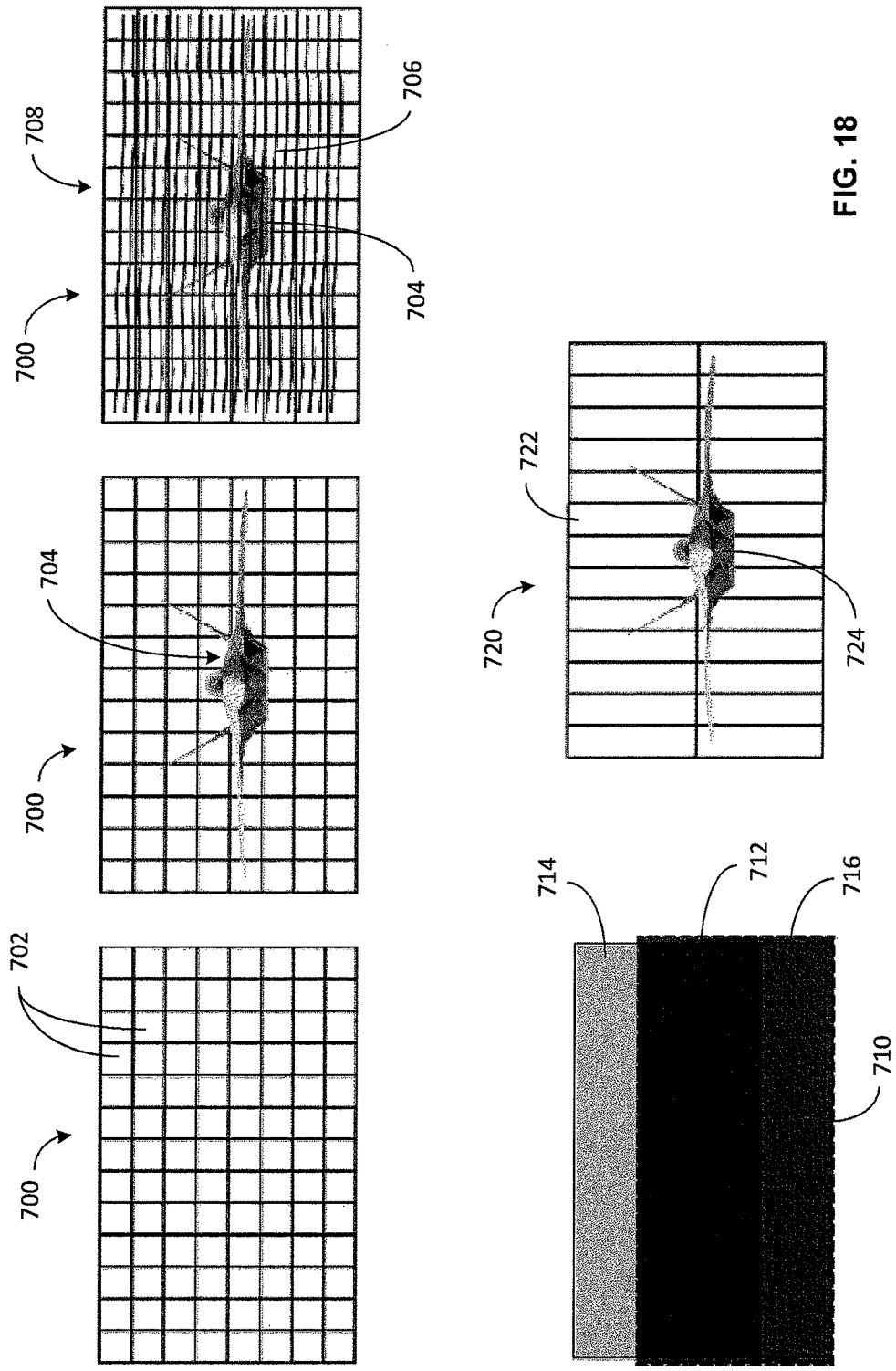
FIG. 18 shows that in some situations, a mask shape and/or orientation can yield a projected 3-D image having a reduced resolution along a selected direction. The reduced resolution is a trade-off resulting from encoding complex information from the images.

In some implementations, the masking configuration can impact a resolution of a projected image. For example, FIG. 18 shows imaging, masking and projecting configurations where a viewing resolution can be degraded from an imaging and intensity modulation resolution(s). An example imaging sensor 700 is depicted as having an array of pixels 702 that can be approximated as squares. Such a configuration can include a number of currently available imaging sensors and intensity modulation devices.

On such an array, an intensity image of an object 704 is shown (upper, middle). In the upper right panel, an interference 708 pattern is shown including fringes 706 resulting from interference of a beam from the object and a reference beam so as to encode phase information.

Figure 19:
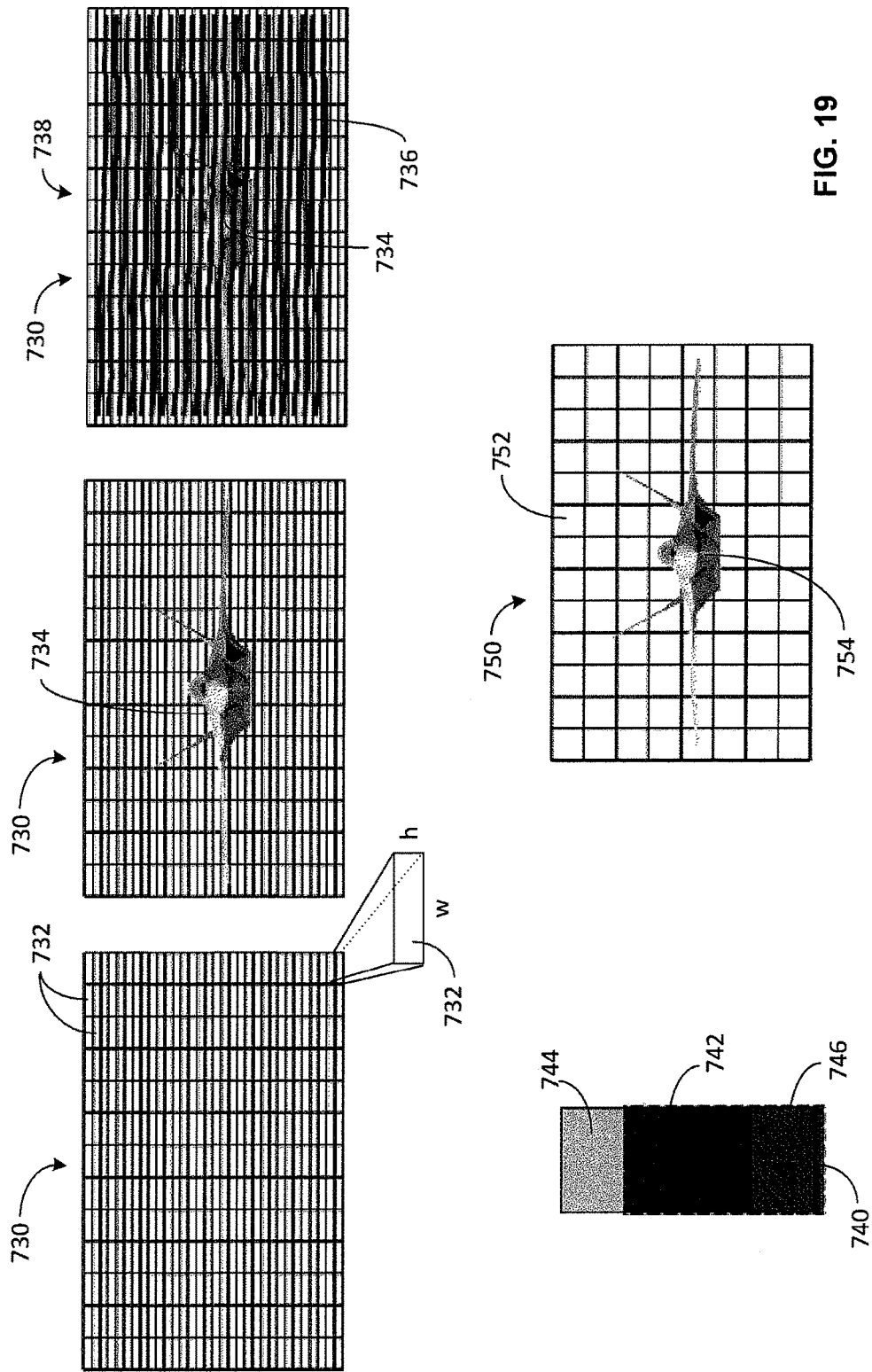
FIG. 19 shows that in some embodiments, a camera system's imaging sensor can be configured to have different resolutions along X and Y directions so as to yield a projected 3-D image having desired X and Y resolutions. In particular, the effect of reduce resolution shown in FIG. 18 can be at least partially offset by using anamorphic sensor array, such as a CCD having pixels with different height and width, to deliver symmetrically scaled image.

The lower left panel shows an example projector mask 710 that blocks a center lobe 712 and one side lobe 716 and allowing the other side lobe 714 to be projected. Such a projection can yield, for example, an elongated exit pupil such as that described reference to FIG. 12. At least in part due to such a horizontally elongated exit pupil in FIG. 12, a viewed 3-D image can have different horizontal and vertical resolutions. In the example shown in FIG. 18, the effective horizontal numerical aperture is larger than the effective vertical numerical aperture. Accordingly, the horizontal resolution is affected less by the masking configuration, while the vertical resolution can be affected significantly. Such a vertical resolution degradation is depicted as vertically elongated pixel 722 representation of a viewed image 720 in the lower right panel. In one example, an aspect ratio of 4:1 (horizontal:vertical) in an exit pupil can yield a degradation by a factor of about 4 along the horizontal direction The foregoing example and similar resolution degradation issues can be addressed in a number of ways. For example, FIG. 19 shows that in some implementations, an imaging sensor and an intensity modulation device (collectively indicated as 730) can be configured as an array of pixels having a non-unity aspect ratio. As shown, the masking configuration of FIG. 19 showing masking 740 of the central 742 and side lobe 746 and passing side lobe 744 also yields a horizontally elongated exit pupil that can degrade the vertical resolution. To compensate, each pixel 732 can be dimensioned so that the height (h) is less than the width (w). Such dimensions can be selected so that upon projection, a viewed image 750, 754 has desired effective horizontal and vertical resolutions (e.g., same resolution as depicted by squares 752).

Figure 20:
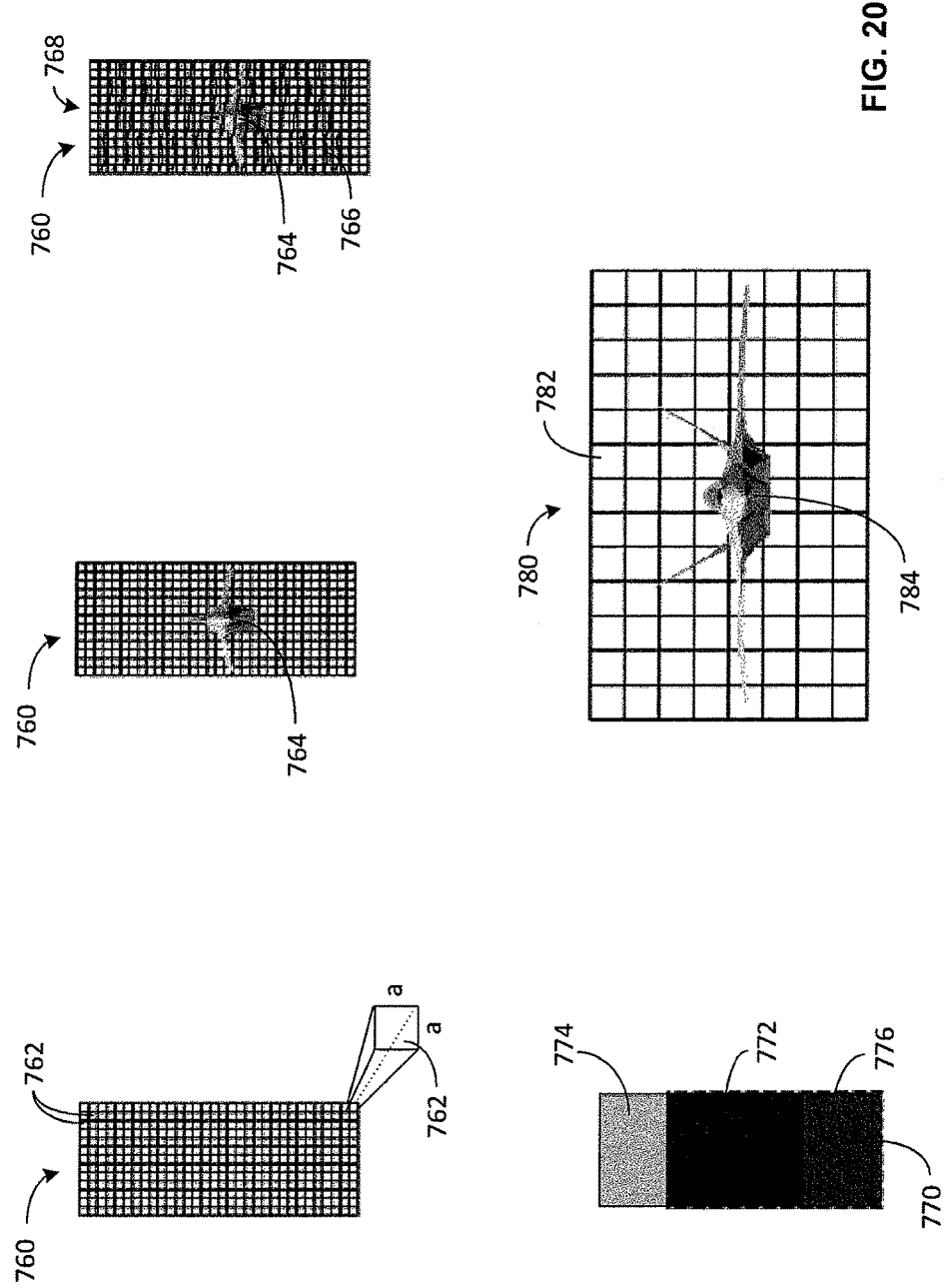
FIG. 20 shows that in some embodiments, a camera system can be configured to form an image that is stretched along one direction on a uniform-pixel sensor so as to yield a projected 3-D image having desired X and Y resolutions. Accordingly, anamorphic sampling produced by anamorphic optics (or pixels) can yield symmetric imagery.

In some situations, an imaging sensor and an intensity modulation device having elongated pixels may not be practical. A similar result can be achieved with use of pixels with an aspect ratio of about 1. FIG. 20 shows that in some implementations, an array of approximately square pixels 762 can be provided for an imaging sensor and an intensity modulation device (collectively indicated as 760). As shown, an image 764 formed thereon can be magnified non-uniformly (e.g., by a non-uniform magnification optics in the camera) such that the image is expanded along one direction among a larger number of pixels (e.g., along a vertical direction having larger number of pixels). Such a non-uniformly magnified image 764 is shown in the top middle panel. Top right panel shows image 764 together with fringe pattern 766 resulting from interference with a reference beam.

As shown, the masking configuration of FIG. 20 with the masking 770 of the central 772 and side lobe 776 and passing side lobe 774 also yields a horizontally elongated exit pupil that can degrade the vertical resolution. Thus, upon projection and restoration of uniform magnification (to yield a viewed image 780, 784), the vertical resolution degradation can be absorbed by the larger number of original pixels. Accordingly, the viewed image 780 can have desired effective horizontal and vertical resolutions (e.g., same resolution as depicted by squares 782).

Figure 21:
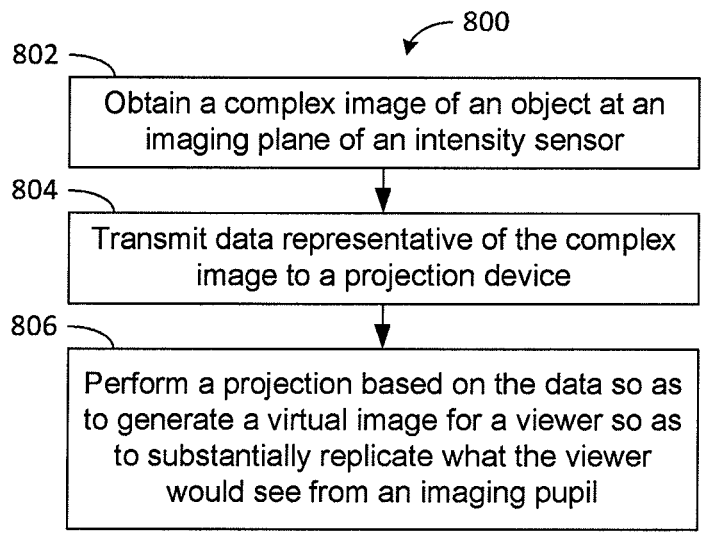
FIG. 21 shows a process that can be implemented to obtain a complex image by an intensity sensor and to perform a projection based on such an image for a viewer so as to substantially replicate what the viewer would see if positioned at the intensity sensor.

FIG. 21 shows a process 800 that can be implemented to perform image capturing and projection as described herein. In block 802, a complex image of an object at an imaging plane of an intensity sensor can be obtained. In block 804, data representative of the complex image can be transmitted to a projection device. In block 806, a projection based on the data can be performed so as to generate a virtual image for a viewer so as to substantially replicate what the viewer would see from an imaging pupil.

Figure 22:
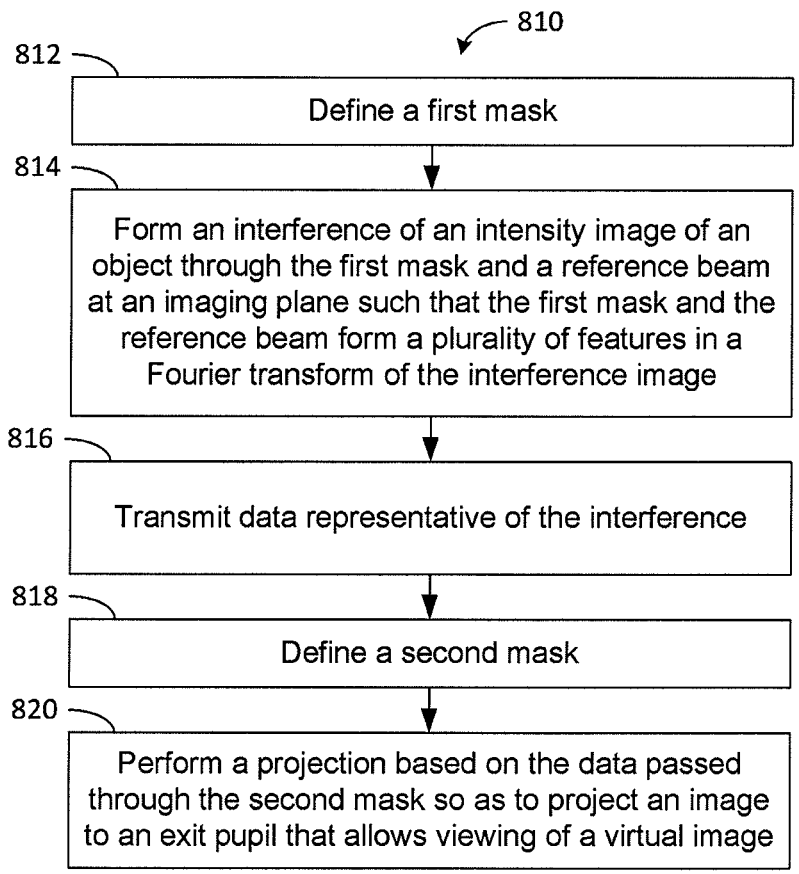
FIG. 22 shows a process that can be implemented as a more specific example of the process of FIG. 21.

FIG. 22 shows a process 810 that can be implemented as a more specific example of the process 800 of FIG. 21. In block 812, a first mask can be defined for imaging. In block 814, an interference of an intensity image of an object through the first mask and a reference beam can be formed at an imaging plane, such that the first mask and the reference beam forms a plurality of separate features in a Fourier transform of the interference image. In some implementations, such separate features can include two side lobes disposed about a central lobe. In block 816, data representative of the interference can be transmitted. In block 818, a second mask can be defined for projection. In block 820, projection can be performed based on the data (e.g. using a spatial light modulator driven by the data) and through the second mask so as to project an image to an exit pupil and form a virtual image of the object that can be seen by a viewer. In some implementations, such a virtual image viewed at the exit pupil can substantially replicate what the viewer would see at the first mask.

A wide range of variations however are possible.

Figure 23:
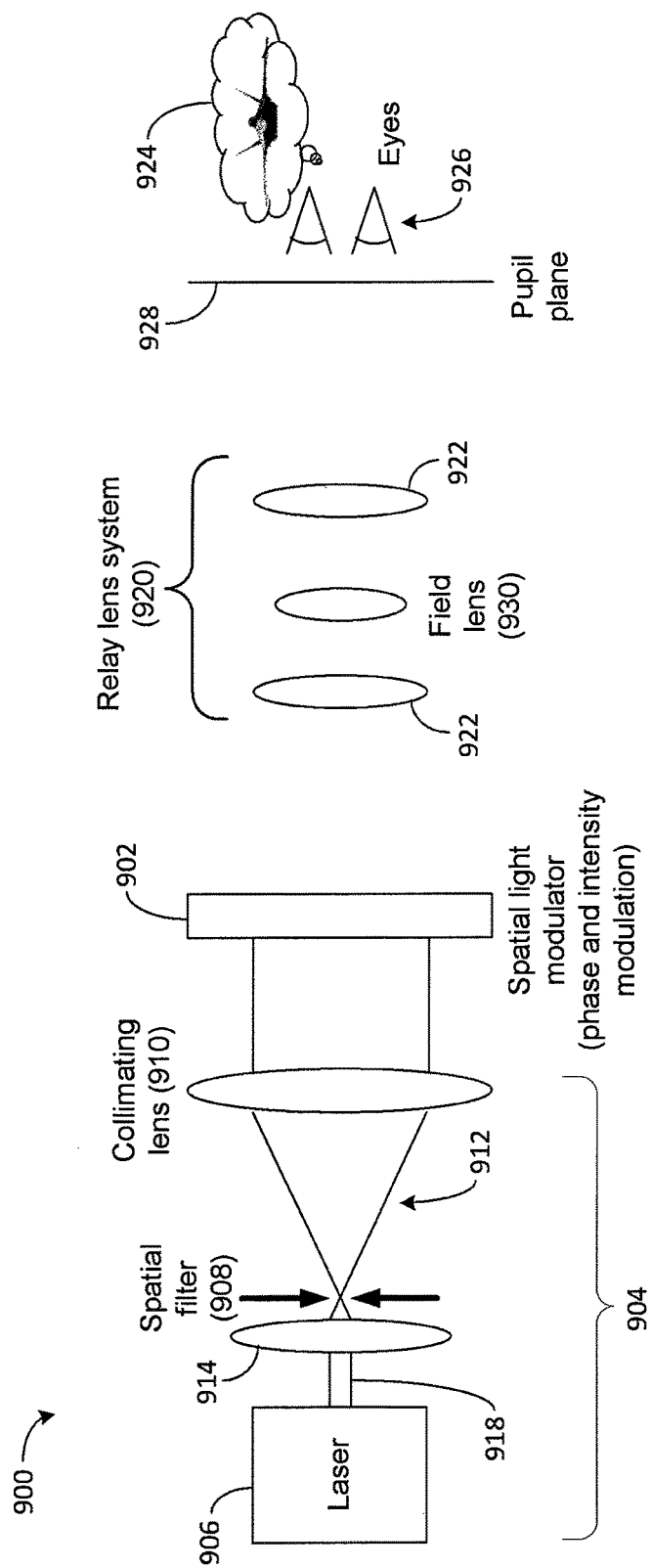
FIG. 23 shows another example projection system that can be configured to receive data representative of the output of the camera system of FIG. 4 and generate a 3-D image for a viewer.

FIG. 23, for example, shows an embodiment of a projector 900 configured differently. The projector 900 includes a spatial light modulator 902 that is capable of modulating both intensity and phase. Accordingly, intensity and phase information from the complex image obtained from the camera can drive the spatial light modulator 902 to produce an image.

The projector 900 shown in FIG. 23 includes an illumination assembly 904 comprising a light source 906, a spatial filter 908, and a collimating lens 910 along an optical path 912 to the spatial light modulator 902. The light source 906 can comprise, for example, a laser or other coherent light source. A focusing lens 914 is also included between the light source 906 and the spatial filter 908. The collimating lens 910 is disposed in the optical path 912 between the spatial filter 908 and the spatial light modulator 902. Light 918 is emitted from the light source 906 and is focused down onto the spatial filter 908 by the focusing lens 914. The collimating lens 910 collects light from the spatial filter 908 and collimates the light. This collimated light is directed onto the spatial light modulator 902 thereby backlighting the spatial light modulator.

In the embodiment shown in FIG. 23, the spatial light modulator 902 is a transmissive spatial light modulator that modulates the intensity and phase of light transmitted therethrough. In other embodiments, the spatial light modulator 902 may comprise a reflective spatial light modulator that modulates the intensity and phase of light reflected from the spatial light modulator. In such cases, the illumination assembly may be disposed so as to front illuminate the reflective spatial light modulator.

The projector 900 further comprises a relay system 920 or projection optics, which may comprise a plurality of lenses 922, to form an image 924 viewable by the eyes 926 of a viewer. This image 924 may comprise a virtual image. The relay system 920 may also relay the pupil associated with the beam from the spatial light modulator 902 to the pupil plane 928 where the viewer's eyes 926 may be positioned to view the image 924. This pupil may correspond to the aperture and pupil of the camera that produced the complex image data that is used to drive the spatial light modulator 902. The relay system 920 may include magnification or minification to increase or decrease the size of (and possibly change the shape of) the pupil located at the pupil plane as needed. The relay system 920 may additionally include a field lens 930 that may be used to provide suitable eye relief. Although three lenses are shown in the relay system 920, more or less optical elements may be included, the optical elements may be different than shown and may be arranged differently. More complex systems may be employed. Such systems may or may not include zoom, for example, via movement of one or more optical element therein.

The projection system 900 shown in FIG. 23 may include a mask, although such a mask is not required. Accordingly, in some embodiments the projector 900 may be simpler in some respects than the projector shown in FIG. 5, which includes a mask for blocking lobes of the beam.

Figure 24:
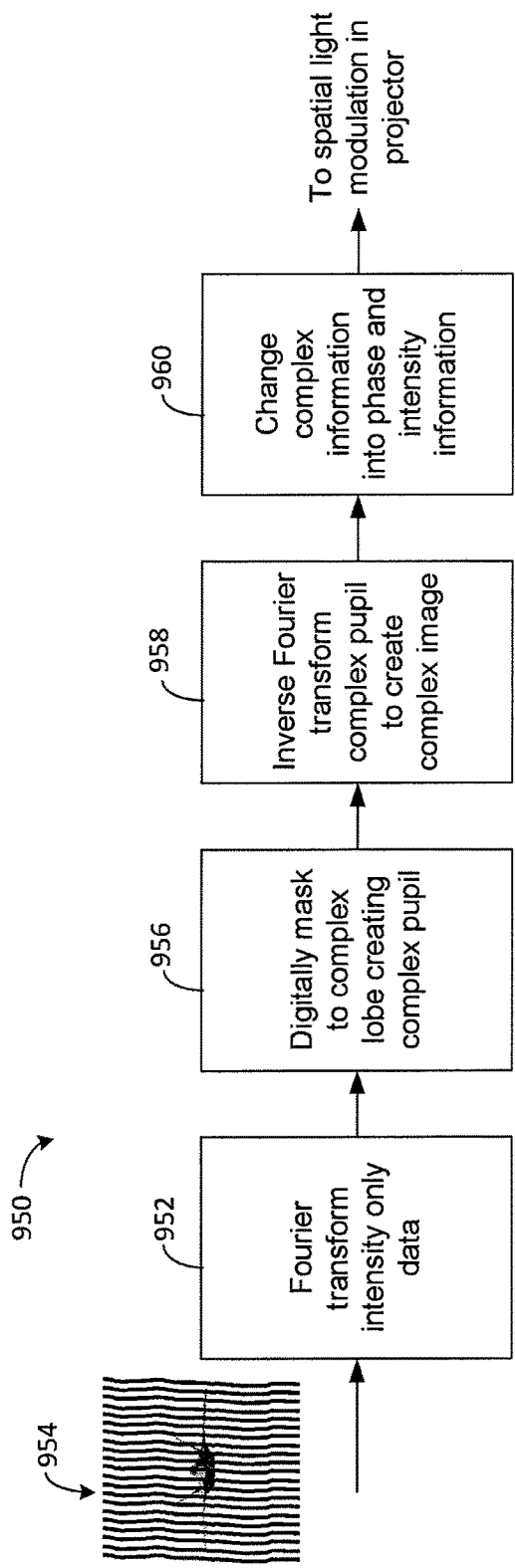
FIG. 24 is a flow chart showing processing of data from a camera such as for example shown in FIG. 4 so as to drive a spatial light modulator in the projection system shown in FIG. 23.

Use of the projection system 900 shown in FIG. 23, however, may involve additional digital processing of the signal from the camera. FIG. 24 show a flow chart 950 that includes an example of such processing. As illustrated in block 952, the spatial intensity image 954 formed at the sensor of the camera, including the fringe pattern, is Fourier transformed so as to provide a frequency distribution. As discussed above, this distribution may comprise a plurality of lobes such as a central lobe and side lobes. In block 956, a digital mask is used to mask a portion of the frequency distribution, for example, the central lobe and one of the side lobes. The other side lobe is retained so as to provide complex image data and more particularly phase data. In various embodiments, this mask is implemented digitally instead of using a physical mask. In block 958, the inverse Fourier transform is performed on the portion of the frequency distribution that is not masked off, e.g., the side lobe that is retained, so as to create a complex image with phase information. This complex information may be changed (block 960) into the desired phase and intensity information or other suitable format to drive the spatial light modulator of the projector in FIG. 23. Although Fourier transforms and inverse Fourier transforms may be employed to convert spatial coordinate data into frequency components and vice versa, other transforms and other methods may be used.

Figure 25:
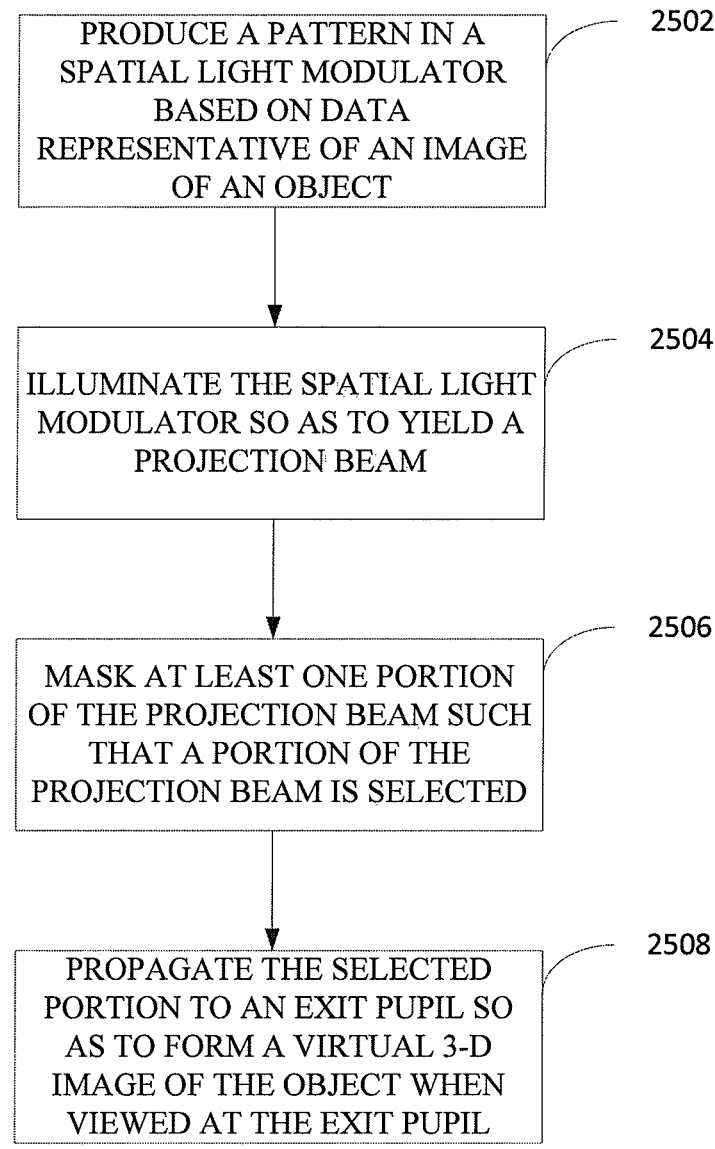
FIG. 25 is a flowchart illustrating an implementation of a method for generating a three-dimensional image.

FIG. 25 is a flowchart illustrating an implementation of a method for generating a three-dimensional image. At block 2502, a pattern is produced in, or on, a spatial light modulator based on data representative of an image of an object. At block 2504, the spatial light modulator is illuminated with light to yield or produce a projection beam. At block 2506, at least one portion of the projection beam is masked such that a portion of the projection beam is selected. At block 2508, the selected portion of the projection beam is propagated to an exit pupil so as to form a virtual three-dimensional image of the object when viewed at the exit pupil. Certain example implementations of such methods are illustrated and described with reference to FIGS. 10-14 and 15A-15D.

Figure 26:
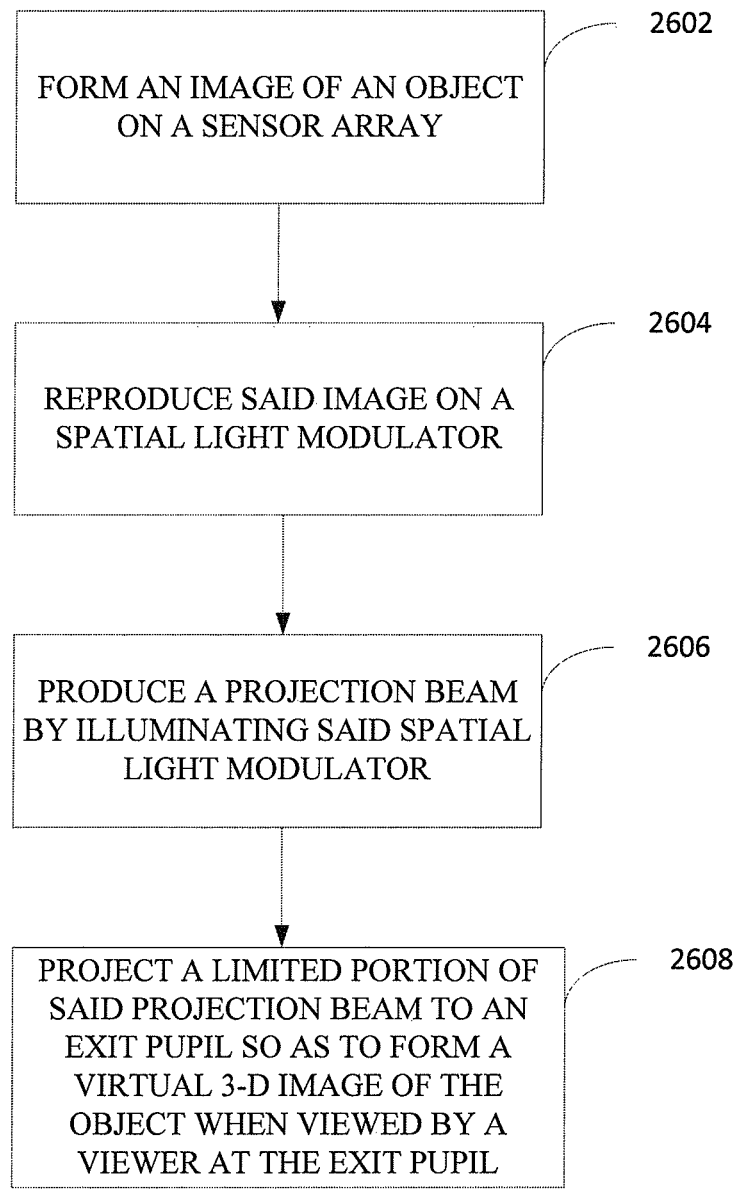
FIG. 26 is a flowchart illustrating an implementation of a method for generating a three-dimensional image.

FIG. 26 is a flowchart illustrating an implementation of a method for generating a three-dimensional image. At block 2602 an image of an object is formed on a sensor array. At block 2604, the method includes reproducing the image on a spatial light modulator. At block 2606, the method includes illuminating the spatial light modulator to produce a projection beam. At block 2608, the method includes projecting a limited portion of said projection beam to an exit pupil so as to form a virtual 3-D image of the object when viewed by a viewer at the exit pupil. Certain example implementations of such methods are illustrated and described with reference to FIGS. 10-14 and 15A-15D.

Any of the processes may be performed in the camera, the projector, or other hardware. For example, in some embodiments all the processing is performed in either the camera or the projector or one or more components other than the camera and the projector. In some embodiments different portions of the processing are performed in the camera and the projector or in the camera and one or more additional components, or in the projector and one or more additional components. In some embodiments, different portions of the processing are performed in the camera, the processor, and one or more additional components. Accordingly, different portions of the processing may be performed remotely.

In contrast, using the projector shown in FIG. 5 may reduce or eliminate much of this digital processing such as the processing of the different block shown in FIG. 24. A signal representative of the output of the sensor in the camera of FIG. 4 may be directly connected to the spatial light modulator of FIG. 5 without the need for digital Fourier/frequency transforming, digital masking, and/or digital inverse Fourier transforming. In some embodiments, therefore, the connection from the camera of FIG. 4 and the projector of FIG. 5 can be a closed circuit connection without signal processing therebetween.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for generating a 3-D image, the method comprising:
    producing a pattern in a spatial light modulator based on data representative of an image of an object, the data being obtained from an image that is formed by interfering (i) an intensity beam reflected from the object and obtained through an imaging pupil and (ii) a reference beam, the imaging pupil and the reference beam forming separate features in a Fourier transform of the image, said separate features comprising a central lobe and side lobes;
    illuminating the spatial light modulator so as to yield a projection beam;
    masking at least one portion of the projection beam such that a portion of the projection beam is selected; and
    propagating the selected portion to an exit pupil so as to form a virtual 3-D image of the object when viewed at the exit pupil.

2. The method of claim 1, wherein said image is formed on a sensor array that outputs a signal representative of said image of said object.

3. The method of claim 2, further comprising transmitting said data representative of the image of said object to said spatial light modulator, said data coming from said signal.

4. The method of claim 2, wherein said signal is coupled to said spatial light modulator such that said pattern can be produced by the spatial light modulator.

5. The method of claim 2, wherein said sensor array comprises anamorphic shaped pixels thereby compensating for loss of resolution due to the masking.

6. The method of claim 1, wherein forming of the image of said object includes forming an intensity image including interference fringes resulting from the interference.

7. The method of claim 1, wherein the virtual 3-D image viewed at the exit pupil substantially replicates what the viewer would see when positioned at the imaging pupil.

8. The method of claim 1, further comprising adjusting the exit pupil's location relative to a viewpoint.

9. The method of claim 1, wherein at least one of forming the image of said object or producing a pattern in a spatial light modulator are performed so that their respective images compensate for loss of resolution due to the masking.

10. The method of claim 1, wherein said spatial light modulator comprises anamorphic shaped pixels thereby compensating for loss of resolution due to the masking.

11. The method of claim 1, wherein the image is formed with non-uniform magnification in different directions.

12. The method of claim 11, wherein the selected portion of the projection beam corresponds to one of the side lobes.

13. The method of claim 1, wherein the at least one portion of the projection beam includes a center lobe and side lobes.

14. An apparatus for generating a 3-D image, the apparatus comprising:
    a spatial light modulator capable of producing a pattern based on data representative of an image of an object, the data being obtained from an image of the object that is formed by interfering (i) an intensity beam reflected from the object and obtained through an imaging pupil and (ii) a reference beam, the imaging pupil and the reference beam forming separate features in a Fourier transform of the image, said separate features comprising a central lobe and side lobes;
    a light source disposed to illuminate the spatial light modulator so as to yield a projection beam;
    a mask configured to mask at least one portion of the projection beam such that a portion of the projection beam is selected; and
    projection optics configured to propagate the selected portion to an exit pupil so as to form a virtual 3-D image of the object when viewed at the exit pupil.

15. The apparatus of claim 14, further comprising a camera comprising the imaging pupil and a reference beam arm providing the reference beam, said camera configured to interfere the intensity beam reflected from the object and obtained through the imaging pupil and the reference beam thereby forming said image of said object from which said data is obtained.

16. The apparatus of claim 15, further comprising a sensor on which said image is formed, said sensor having an output that outputs a signal representative of said image of said object.

17. The apparatus of claim 16, wherein said sensor is in communication with said spatial light modulator such that said data representative of the image of said object can be transmitted to said spatial light modulator, said data coming from said signal.

18. The apparatus of claim 16, wherein said sensor comprises anamorphic shaped pixels thereby compensating for loss of resolution due to the masking.

19. The apparatus of claim 14, wherein the virtual 3-D image viewed at the exit pupil substantially replicates what a viewer would see when positioned at the imaging pupil.

20. The apparatus of claim 14, wherein the exit pupil is dimensioned to provide a viewable area that covers both of a viewer's eyes.

21. The apparatus of claim 14, wherein said spatial light modulator comprises anamorphic shaped pixels thereby compensating for loss of resolution due to the masking.

22. The apparatus of claim 14, wherein the projection optics that convey the projection beam from the mask to the eye provide non-uniform magnification in different directions.

23. The apparatus of claim 14, wherein the at least one masked portion of the projection beam includes a center lobe and a side lobe.

24. The apparatus of claim 14, wherein the selected portion of the projection beam corresponds to one of the side lobes.

25. A method for generating a 3-D image, the method comprising:
    forming an image of an object on a sensor array;
    reproducing said image on a spatial light modulator;
    producing a projection beam by illuminating said spatial light modulator; and
    projecting a limited portion of said projection beam to an exit pupil so as to form a virtual 3-D image of the object when viewed by a viewer at the exit pupil, wherein said limited portion comprises only one side lobe of said beam.

26. The method of claim 25, wherein said limited portion comprises less than half of light in said beam.

27. The method of claim 25, wherein the sensor array comprises an imaging pupil and the virtual 3-D image viewed at the exit pupil substantially replicates what the viewer would see when positioned at the imaging pupil.

28. The method of claim 25, wherein forming the image of the object includes forming an intensity image including interference fringes resulting from the interference.

29. A method for generating a 3-D image, the method comprising:
- processing image data by performing at least one of a digital spatial domain to spatial frequency domain transform, digital masking, or a digital spatial frequency domain to spatial domain transform;
- producing a pattern in a spatial light modulator that selectively modulates the phase of light using said processed data;
- illuminating the spatial light modulator so as to yield a projection beam; and
- propagating at least a portion of the beam to an exit pupil so as to form a virtual 3-D image of the object when viewed by a viewer at the exit pupil, wherein said portion of the beam comprises at least one of a center lobe or a side lobe of said beam.

30. The method of claim 29, wherein processing image data comprises interfering an intensity beam reflected from the object and obtained through an imaging pupil and a reference beam, wherein the imaging pupil and the reference beam form separate features in a Fourier transform of the image, said separate features comprising a central lobe and side lobes.

31. The method of claim 29, wherein propagating the portion of the beam comprises masking the projection beam to block remaining portions of the beam while allowing the portion of the beam to propagate.

32. A method for generating a 3-D image, the method comprising:
- forming an image of an object, the image including an interference of an intensity image of the object obtained through an imaging pupil and a reference beam, the imaging pupil and the reference beam forming separate features in a Fourier transform of the interference, said separate features comprising a central lobe and side lobes;
- transmitting data representative of the image;
- generating a projectable image based on the data;
- illuminating the projectable image so as to yield a projection beam;
- separating the projection beam spatially based on the separate features of the Fourier transform of the interference;
- masking the separated projection beam such that a selected portion of the projection beam is allowed to pass and the remaining portion is blocked; and
- projecting the selected portion to an exit pupil so as to form a virtual 3-D image of the object when viewed by a viewer at the exit pupil.

33. The method of claim 32, wherein the separated projection beam comprises a center lobe and a side lobe.

34. The method of claim 32, wherein the selected portion comprises a side lobe.

35. The method of claim 32, wherein generating a projectable image based on the data comprises producing a pattern in a spatial light modulator based on data representative of the image, and wherein illuminating the projectable image comprises illuminating the spatial light modulator.

* * * * *